US012617538B2

(12) United States Patent
Gajanayake et al.

(10) Patent No.: US 12,617,538 B2
(45) Date of Patent: May 5, 2026

(54) ELECTRICAL SYSTEM

(71) Applicant: ROLLS-ROYCE PLC, London (GB)

(72) Inventors: Chandana J Gajanayake, Singapore (SG); Devinda A Molligoda, Nugegoda (LK)

(73) Assignee: ROLLS-ROYCE PLC, London (GB)

( * ) Notice: Subject to any disclaimer, the term of this patent is extended or adjusted under 35 U.S.C. 154(b) by 70 days.

(21) Appl. No.: 18/672,375

(22) Filed: May 23, 2024

(65) Prior Publication Data

US 2024/0417084 A1 Dec. 19, 2024

(30) Foreign Application Priority Data

Jun. 19, 2023 (GB) ...................................... 2309170

(51) Int. Cl.
| | |
|---|---|
| *B64D 27/35* | (2024.01) |
| *H01M 8/04537* | (2016.01) |
| *H01M 8/04858* | (2016.01) |
| *H01M 10/42* | (2006.01) |
| *H01M 16/00* | (2006.01) |

(Continued)

(52) U.S. Cl.
CPC ........ *B64D 27/35* (2024.01); *H01M 8/04559* (2013.01); *H01M 8/04589* (2013.01); *H01M 8/04619* (2013.01); *H01M 8/04865* (2013.01); *H01M 10/425* (2013.01); *H01M 16/006* (2013.01); *H02J 1/084* (2020.01); *H02J 7/0047* (2013.01); *H02J 7/0068* (2013.01);

(Continued)

(58) Field of Classification Search
None
See application file for complete search history.

(56) References Cited

U.S. PATENT DOCUMENTS

| | | | |
|---|---|---|---|
| 7,557,532 B2 | 7/2009 | Liu et al. | |
| 10,483,573 B2 | 11/2019 | Agnew | |

(Continued)

FOREIGN PATENT DOCUMENTS

| | | |
|---|---|---|
| CN | 1726609 A | 1/2006 |

OTHER PUBLICATIONS

Dec. 8, 2023 Search Report issued in British Patent Application No. 2309170.5.

(Continued)

*Primary Examiner* — Daniel Cavallari
*Assistant Examiner* — Aqeel H Bukhari
(74) *Attorney, Agent, or Firm* — Oliff PLC

(57) ABSTRACT

An electrical system includes: a battery; a fuel-cell pack; a load electrically coupled to the fuel-cell pack; a switching arrangement electrically coupled to the battery, the fuel-cell pack and the load; a DC-DC converter; and a control system. The switching arrangement configures the electrical system in at least one of a battery-charge mode and a combined-drive mode. In the battery-charge mode the battery is coupled in series to the fuel-cell pack and the load via the DC-DC converter for simultaneous charging of the battery and driving of the load by the fuel-cell pack. In the combined-drive mode, the battery is coupled in series to the fuel-cell pack and the load via the DC-DC converter for driving of the load by both the battery and the fuel-cell pack. The control system is configured to: monitor a parameter of an electrical power provided to the load; and control the DC-DC converter.

17 Claims, 11 Drawing Sheets

(51) Int. Cl.
    *H02J 1/08*           (2026.01)
    *H02J 7/00*           (2026.01)
    *H02J 7/34*           (2006.01)

(52) U.S. Cl.
    CPC ............ *H02J 7/00712* (2020.01); *H02J 7/34*
        (2013.01); *H01M 2220/20* (2013.01); *H01M*
               *2250/20* (2013.01)

(56)                References Cited

U.S. PATENT DOCUMENTS

2003/0201674 A1 * 10/2003  Droppo .................... H02J 7/34
                                           307/82
2010/0221626 A1    9/2010  Horiguchi et al.
2011/0198921 A1    8/2011  Sone
2013/0038120 A1    2/2013  Mimatsu et al.
2021/0320353 A1 * 10/2021  Miftakhov ........ H01M 8/04888
2023/0282855 A1 *  9/2023  Yoon ................... H01M 8/0488

OTHER PUBLICATIONS

Dec. 8, 2023 Search Report issued in British Patent Application No.
2309171.3.
U.S. Appl. No. 18/672,407, filed May 23, 2024 in the name of
Chandana J Gajanayake et al.

\* cited by examiner

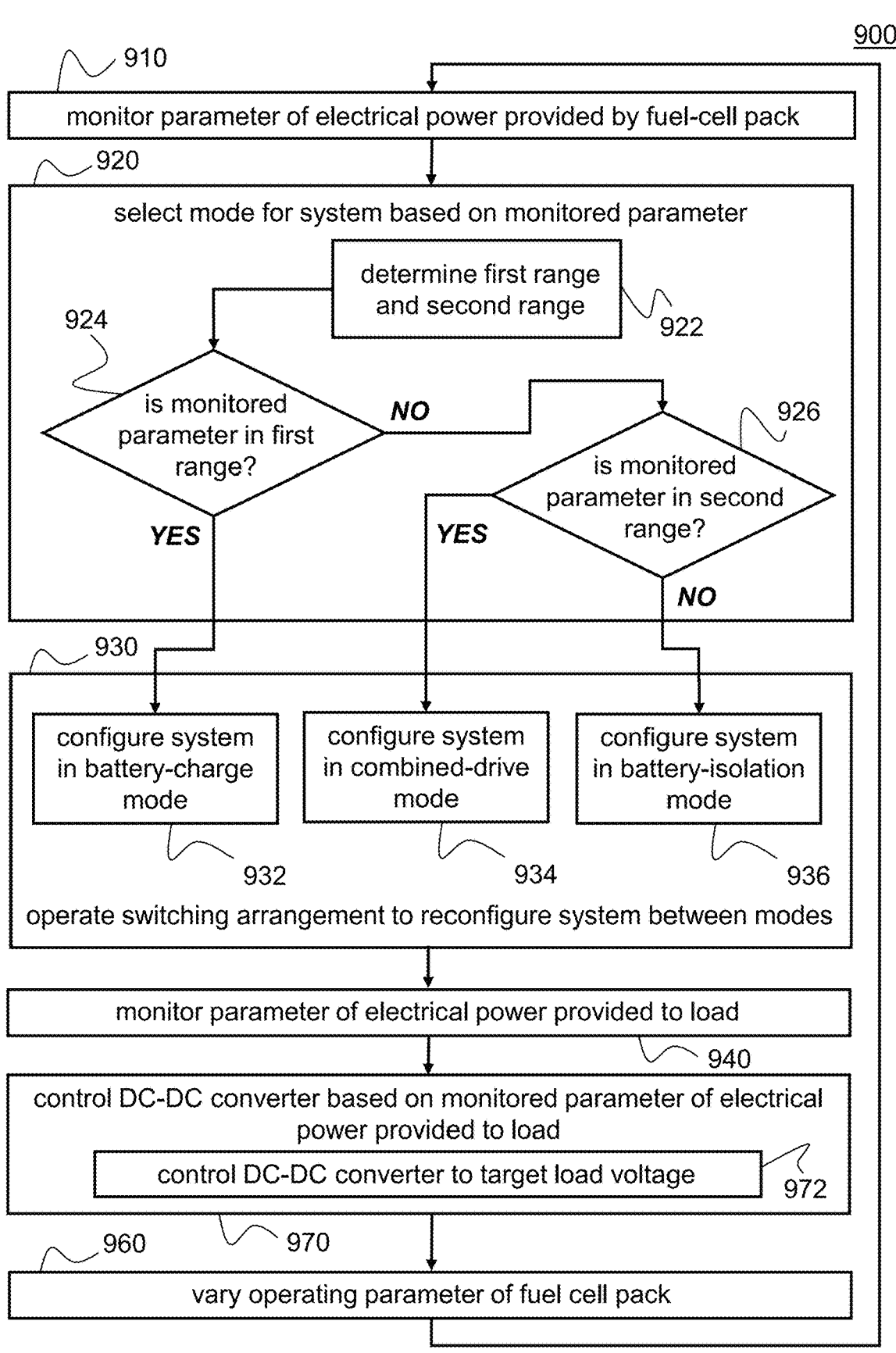

900

910 monitor parameter of electrical power provided by fuel-cell pack

920 select mode for system based on monitored parameter determine first range and second range

922

924 is monitored parameter in first range?

NO

926 is monitored parameter in second range?

YES

YES

NO

930 configure system in battery-charge mode configure system in combined-drive mode configure system in battery-isolation mode

932

934

936 operate switching arrangement to reconfigure system between modes monitor parameter of electrical power provided to load

940 control DC-DC converter based on monitored parameter of electrical power provided to load control DC-DC converter to target load voltage

972

960

970 vary operating parameter of fuel cell pack

FIG. 9

*FIG. 10*

ELECTRICAL SYSTEM

This specification is based upon and claims the benefit of priority from UK Patent Application Number 2309170.5 filed on 19 Jun. 2023, the entire contents of which are incorporated herein by reference.

BACKGROUND

Technical Field of the Disclosure

This disclosure concerns an electrical system comprising: a battery; a fuel-cell pack; a load electrically coupled to the fuel cell a switching arrangement electrically coupled to the battery, the fuel-cell pack and the load; a DC-DC converter; and a control system. The disclosure further concerns an aircraft comprising such an electrical system.

Background of the Disclosure

In view of current industrial trends and objectives, it is desirable to incorporate a greater degree of electrical functionality on an aircraft airframe and/or on propulsive device such as a gas turbine engine. In particular, it is desirable to provide an electrical system which is able to meet a power demand of a load (e.g., a propulsive device of an aircraft) across a broad range of operating scenarios.

U.S. Pat. No. 7,557,532 B2 describes a voltage supplying apparatus comprising a fuel cell, a DC-DC voltage converter and a control circuit. The DC-DC voltage converter is used to receive a voltage outputted from the fuel cell and then to output another voltage. Then, the respective voltages outputted from the fuel cell and the DC-DC voltage converter are combined to be an output voltage of the voltage supplying apparatus. The control circuit is used to control operation of the DC-DC voltage converter according to a magnitude of the output voltage of the voltage supplying apparatus.

U.S. Pat. No. 10,483,573 B2 describes a fuel cell unit comprising a fuel cell and a regulating voltage converter, and further describes a fuel cell module comprising a plurality of fuel cell units connected in parallel.

SUMMARY

According to a first aspect there is provided an electrical system comprising: a battery; a fuel-cell pack; a load electrically coupled to the fuel-cell pack; a switching arrangement electrically coupled to the battery, the fuel-cell pack and the load; a DC-DC converter; and a control system; wherein the switching arrangement is operable to selectively configure the electrical system in at least one of a battery-charge mode and a combined-drive mode; wherein in the battery-charge mode the battery is coupled in series to the fuel-cell pack and the load via the DC-DC converter for simultaneous charging of the battery and driving of the load by the fuel-cell pack; wherein in the combined-drive mode the battery is coupled in series to the fuel-cell pack and the load via the DC-DC converter for driving of the load by both the battery and the fuel-cell pack; and wherein the control system is configured to: monitor a parameter of an electrical power provided to the load; and control the DC-DC converter based on the monitored parameter of the electrical power provided to the load.

It may be that the monitored parameter of the electrical power provided to the load is a voltage across the load or a current through the load.

The control system is configured to control the DC-DC converter to target maintaining the monitored voltage across the load at a target load voltage.

It may be that the switching arrangement is operable to selectively configure the electrical system in each of: the battery-charge mode; and the combined-drive mode. It may also be that the control system is configured to operate the switching arrangement to selectively reconfigure the electrical system between the battery-charge mode and the combined-drive mode.

The control system may be configured to: monitor a parameter of an electrical power provided by the fuel-cell pack; and operate the switching arrangement to selectively reconfigure the electrical system between the battery-charge mode and the combined-drive mode based on the monitored parameter of the electrical power provided by the fuel-cell pack.

It may be that: when the electrical system is in the battery-charge mode, a polarity of the battery is in a first orientation with respect to a polarity of the fuel-cell pack; and when the electrical system is in the combined-drive mode, the polarity of the battery is in a second orientation with respect to the polarity of the fuel-cell pack, and wherein the second orientation opposes the first orientation.

Further, it may be that the control system is configured to operate the switching arrangement to selectively reconfigure the electrical system in: the battery-charge mode in response to a determination that the monitored parameter is in a first range indicative of a power demand of the load being relatively low; and the combined-drive mode in response to a determination that the monitored parameter is in a second range indicative of the power demand of the load being relatively high. The first and second ranges may be contiguous and separated by a single threshold. At least one threshold, or a plurality of thresholds, separating the first range and the second range may be determined based on a state-of-charge of the battery.

It may be that the switching arrangement is operable to selectively configure the electrical system in each of: the battery-charge mode; the combined-drive mode; and a battery-isolation mode in which: the battery is decoupled from the fuel-cell pack and the load, and the fuel-cell pack is coupled to the load for driving of the load by the fuel-cell pack. In addition, it may be that the control system is configured to operate the switching arrangement to selectively reconfigure the electrical system between the battery-charge mode, the combined-drive mode and the battery-isolation mode.

The control system may be configured to: operate the switching arrangement to selectively reconfigure the electrical system between the battery-charge mode, the combined-drive mode and the battery-isolation mode based on the monitored parameter of the electrical power provided by the fuel-cell pack.

The control system may be configured to monitor the voltage across the load using a voltage sensing arrangement. The control system may be configured to monitor the current drawn by the load using a current sensing arrangement.

It may be that the control system is configured to operate the switching arrangement to selectively reconfigure the electrical system in: the battery-charge mode in response to a determination that the monitored parameter is in a first range indicative of a power demand of the load being relatively low; the combined-drive mode in response to a determination that the monitored parameter is in a second range indicative of the power demand of the load being relatively high; and the battery-isolation mode in response to a determination that the monitored parameter is in an intermediate range defined between the first range and the second range.

The first, intermediate and second ranges may be contiguous and separated by respective first and second thresholds. The first threshold may be greater than the second threshold such that: the first range of the monitored parameter is wholly above both the intermediate range and the second range;

and the second range of the monitored parameter is wholly below than both the first range and the intermediate range. If so, the first threshold may be referred to as an upper threshold and the second threshold may be referred to as a lower threshold. Otherwise, the first threshold may be less than the second threshold such that: the first range of the monitored parameter is wholly below both the intermediate range and the second range; and the second range of the monitored parameter is wholly above than both the first range and the intermediate range. If so, the first threshold may be referred to as a lower threshold and the second threshold may be referred to as an upper threshold.

It may be that at least one of a first threshold and a second threshold respectively separating the first range and the second range from the intermediate range is determined based on a state-of-charge of the battery.

The control system may be configured to: when the electrical system is configured in the battery-charge mode, control the DC-DC converter to target maintaining the monitored voltage across the load at a target load voltage; and when the electrical system is configured in the combined-drive mode, control the DC-DC converter to target maintaining the monitored voltage across the load at a target load voltage.

It may be that: the load is associated with a design operating voltage; and the target load voltage is the design operating voltage of the load.

It may be that the load is associated with a design operating voltage range defined by a lower design operating voltage and an upper design operating voltage. It may also be that the target load voltage is between the lower design operating voltage and the upper design operating voltage.

The control system may be further configured to: monitor a voltage across the load; monitor a voltage across the fuel-cell pack; and vary a reactant flow rate, a cell pressure and/or a cell temperature of the fuel-cell pack to maintain the monitored voltage across the fuel-cell pack as being equal to the monitored voltage across the load.

The control system may be further configured to: monitor a current through the load; monitor a current through the fuel-cell pack; and vary a reactant flow rate, a cell pressure and/or a cell temperature of the fuel-cell pack to maintain the monitored voltage through the fuel-cell pack as being equal to the monitored current through the load.

It may be that the load is associated with a design operating voltage. It may be that the battery has a peak output voltage of no greater than 60% of the design operating voltage of the load.

The DC-DC converter may be selected from a group consisting of: a buck converter; a boost converter; and a buck-boost converter.

It may be that: the switching arrangement includes: a first pair of switching devices coupled in series through a first junction, and a second pair of switching devices coupled in series through a second junction; the first pair of switching devices and the second pair of switching devices are coupled in parallel with each other with respect to a pair of battery connection terminals; and the fuel-cell pack and the load are coupled to or couplable to the switching arrangement at the first junction and the second junction; the battery is coupled to or couplable to the switching arrangement at the pair of battery connection terminals.

It may be that: the first pair of switching devices is comprised of a first primary switching device and a first secondary switching device; the second pair of switching devices is comprised of a second primary switching device and a second secondary switching device; the control system is configured to operate the switching arrangement to selectively reconfigure the electrical system in: the battery-charge mode by operating the first primary switching device and the second secondary switching device in a closed state and operating the first secondary switching device and the second primary switching device in an open state, the combined-drive mode by operating the first secondary switching device and the second primary switching device in the closed state and operating the first primary switching device and the second secondary switching device in the open state, and the battery-isolation mode by: operating the first primary switching device and the second primary switching device in the open state; and/or operating the first secondary switching device and the second secondary switching device in the open state. It may be that each of the first pair of switching devices and each of the second pair of switching devices is a semiconductor-based power switching device.

According to a second aspect there is provided an aircraft comprising an electrical system in accordance with the first aspect. The load may include a motor configured to drive a propulsive device of the aircraft, such as a propellor or a fan. The aircraft may comprise a gas turbine engine. If so, the load may include a motor configured to drive a spool or a fan of a gas turbine engine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which:

FIG. 9 is a flowchart which shows an example method of controlling the electrical system of FIG. 3;

FIGS. 10 and 11 are graphs which show relationships between electrical parameters and energy efficiency, for the example electrical system of FIG. 3 with annotations.

DETAILED DESCRIPTION

Figures 1, 2:
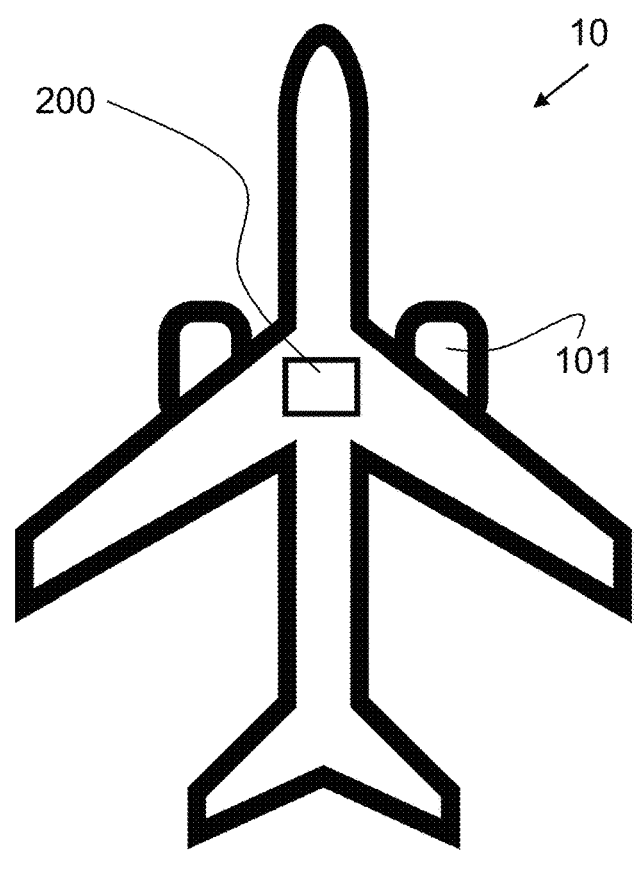
FIG. 1 is a highly schematic view of an aircraft comprising a gas turbine engine.
FIG. 2 shows a general arrangement of a turbofan engine suitable for use with the aircraft of FIG. 1.

FIG. 1 shows a schematic plan view of an aircraft 10 comprising a gas turbine engine 101. The aircraft 10 comprises an electrical system 200 in accordance with the example electrical system 200 described below with reference to FIG. 3. The gas turbine engine 101 may generally be in accordance with the gas turbine engine 10 described below with reference to FIG. 2.

A general arrangement of an engine 101 for an aircraft is shown in FIG. 2. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more DC busses.

The DC busses allow for the distribution of electrical power to other engine electrical loads and to electrical loads on the airframe. The DC busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Figure 3:
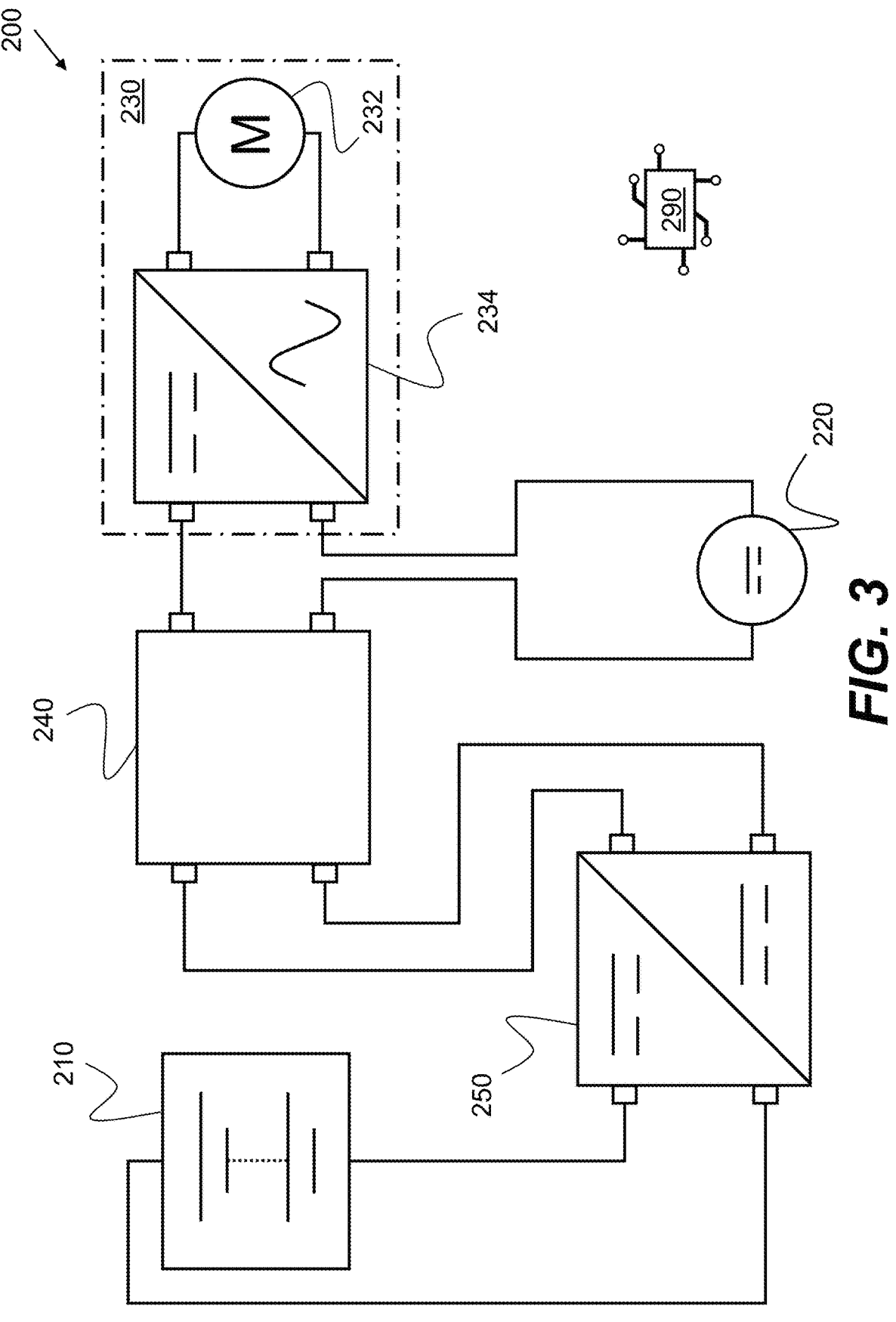
FIG. 3 is a highly schematic diagram which shows an example electrical system comprising a battery, a fuel-cell pack, a load, a switching arrangement and a DC-DC converter.

FIG. 3 is high-level circuit diagram which shows an example electrical system 200. The electrical system 200 comprises a battery 210, a fuel-cell pack 220, a load 230, a switching arrangement 240, a DC-DC converter 250 and a control system 290. The load is electrically coupled in series to the fuel cell pack 290. The switching arrangement 240 is electrically coupled to each of the battery 210, the fuel-cell pack 220 and the load 230. The DC-DC converter 250 is coupled between the battery 210 and the switching arrangement 240 such that the switching arrangement 240 is electrically coupled to the battery 210 via the DC-DC converter 250.

The battery 210 comprises a plurality of battery-cells (not shown) connected in series and/or in parallel, as will be appreciated by those skilled in the art. Each battery-cell may be, for example, a lithium-ion battery-cell. If so, the battery 210 may be referred to as a lithium-ion battery 210. Otherwise, each battery-cell may be a sodium-ion battery-cell, a solid-state battery-cell or a lithium-sulphur battery cell, or any suitable battery type. Similarly, the fuel-cell pack 220 comprises a plurality of fuel-cells (not shown) connected in series and/or in parallel, as will be appreciated by those skilled in the art. Each fuel-cell may be, for example, a hydrogen-based fuel-cell. If so, the fuel-cell pack 220 may be referred to as a hydrogen fuel-cell pack 220. However, this disclosure envisages that other types of fuel-cells may be used as for the fuel-cell pack 220.

The load 230 is generally configured to be driven by (that is, receive power for operation from) the fuel-cell pack 220. In the example of FIG. 3, the load 230 comprises an AC electrical component 232 and a DC-AC converter 234 configured to receive DC power from the fuel-cell pack 220 and to provide AC power to the AC electrical component 232. In the example of FIG. 3, the AC electrical component 232 is an AC motor 232. However, in other examples, the load 230 may not comprise a DC-AC converter and/or an AC electrical component. For instance, the load 230 may otherwise comprise a DC electrical component, such as a DC motor. If the electrical system 200 is incorporated within an aircraft 10, as described above with reference to FIG. 1, the electrical component may be configured to drive a mechanical device of the aircraft 200. By way of example, if the electrical component 232 is a motor 232, the motor 232 may be configured to drive a propulsive device (not shown) of the aircraft 200, such as a propellor or a fan of the aircraft 200. Optionally, if the aircraft 200 comprises a gas turbine engine 101, the motor 232 may be configured to drive a spool or a fan 102 of the gas turbine engine 101 of the aircraft 200. Specifically, the motor 232 may form a part of either of the electric machines 111, 113 described above with respect to FIG. 2.

It may be that the load 230 is associated with a design operating voltage. The design operating voltage of the load 230 may be a rated operating voltage value or an ideal (e.g. optimal or target) operating voltage value for operation of the load 230. Additionally or alternatively, it may be that the load 230 is associated with a design operating voltage range defined by (e.g., between) a lower design operating voltage and an upper design operating voltage. Each design operating threshold may be an upper or a lower rated voltage value or an upper or a lower ideal (e.g. optimal or target) voltage value, respectively, for operation of the load 230. Either of the upper design operating voltage or the lower operating voltage may be simply referred to as the design operating voltage herein.

The control system 290 is generally configured to operate the switching arrangement 240 to selectively configure (and reconfigure) the electrical system 200 in a plurality of modes. The plurality of modes include a battery-isolation mode, a battery-charge mode, and a combined-drive mode. The battery-isolation mode may also be referred to as a battery-bypass mode.

The battery-charge mode and the combined-drive mode may each be considered to be a battery-connected mode, and so the control system 290 can be described as configured to operate the switching arrangement 240 in the battery-isolation mode and a battery-connected mode. In the particular examples described below, the plurality of modes includes both the combined-drive mode and the battery-drive mode (i.e. both of the battery-connected modes), but in other examples the control system 290 and/or switching arrangement 240 may be configured to only configure (and reconfigure) the electrical system in one of the battery-connected modes.

When the electrical system 200 is configured in the battery-isolation mode, the fuel-cell pack 220 is coupled to the load 230 to drive the load 230 while the battery 210 is functionally decoupled from both the fuel-cell pack 220 and the load 230 such that the battery may neither drive the load 230 nor be charged by the fuel-cell pack 220.

When the electrical system 200 is configured in the battery-charge mode, the battery 210 is coupled in series to the fuel-cell pack 220 and the load 230 via the DC-DC converter 250 such that the fuel-cell pack may simultaneously charge the battery 210 and drive the load 230.

When the electrical system 200 is configured in the combined-drive mode, the battery 210 is coupled in series to the fuel-cell pack 220 and the load 230 via the DC-DC converter 250 such that both the battery 210 and the fuel-cell pack 220 may (co-operate to) drive the load 230 together.

The DC-DC converter 250 is generally configured to convert a DC voltage at a second magnitude supplied to the DC-DC converter 250 from the switching arrangement 240 to a DC voltage at a first magnitude for supply to battery 210, and to convert a DC voltage at the first magnitude supplied to the DC-DC converter 250 from the battery 210 to a DC voltage at the second magnitude for supply to switching arrangement 240. A ratio between the first magnitude and the second magnitude may be referred to as a conversion ratio of the DC-DC converter 250. The conversion ratio of the DC-DC converter 250 is controllable by the control system 290 as described in further detail herein.

The control system 290 is configured to operate the electrical system in accordance with the example method 900 described below with reference to FIG. 9. However, description of the electrical system 200 itself now continues with references to FIGS. 4-8, which are circuit diagrams which show respective example electrical topologies 201, 202, 203, 204, 205 suitable for the example electrical system 200 of FIG. 3.

Figure 4:
FIG. 4 is a circuit diagram which shows a first example electrical topology of the example electrical system of FIG. 3.

FIG. 4 is circuit diagram which shows a first example electrical topology 201 for the electrical system 200 of FIG. 3, with like reference numerals denoting common features.

In the example topology 201 of FIG. 4, the switching arrangement 240 includes a total of four switching devices 242, 244, 246, 248. The switching devices 242, 244, 246, 248 are arranged into a first pair 242, 244 and a second pair 246, 248. The first pair of switching devices 242, 244 are coupled in series to one another through a first junction 442, whereas the second pair of switching devices 246, 248 are coupled in series to one another through a second junction 444. In addition, the first pair of switching devices 242, 244 and the second pair of switching devices 246, 248 are coupled to each other in parallel with respect to a pair of battery connection terminals comprising a first battery connection terminal 446 and a second battery connection terminal 448.

The first pair of switching devices 242, 244 comprises a first primary switching device 242 and a first secondary switching device 244. Similarly, the second pair of switching devices 246, 248 comprises a second primary switching device 246 and a second secondary switching device 248. In the example of FIG. 4, each switching device 242, 244, 246, 248 is a semiconductor-based power switching device. Each switching device 242, 244, 246, 248 may include, for example, a transistor or a thyristor. In particular, each switching 242, 244, 246, 248 device may include a field-effect transistor (e.g. a metal-oxide-semiconductor field-effect transistor (MOSFET), as shown in the example FIG. 4), a gate turn-off thyristor, integrated-gate bipolar transistor, an integrated gate-commutated thyristor, an injection-enhanced gate transistor and/or any suitable switching device type. Each switching device 242, 244, 246, 248 being a semiconductor based power switching device may provide a lighter and/or more responsive electrical system 200, which may be particularly advantageous in, but not limited to, the context of aerospace applications.

The battery 210 is coupled to the switching arrangement 240 via the first battery connection terminal 446 and the second battery connection terminal 448. Further, the fuel-cell pack 220 and the load 230 are coupled to the switching arrangement 240 at the first junction 442 and the second junction 444. In the example topology 201 of FIG. 4, the load 230 is represented as comprising a resistive element 230'. However, it will be appreciated that the load 230 may be at least a partially resistive, a partially capacitive and/or a partially inductive load 230.

Each switching device 242, 244, 246, 248 is operable by the control system 290 in, and to move between, an open state and a closed state. In the open state, the respective switching device 242, 244, 246, 248 does not allow conduction (e.g., flow) of a current therethrough subject to the operational condition of any internal components such as a body diode, as will be appreciated by those skilled in the art. In the closed state, the respective switching device 242, 244, 246, 248 allows the conduction (e.g., flow) of a current therethrough. The control system 290 is configured to selectively configure (and reconfigure) the electrical system 200 in each of the battery-charge mode, the combined-drive mode and the battery-isolation mode by operating each switching device 242, 244, 246, 248 in either the open state or the closed state as follows.

The electrical system 200 may be configured in the battery-isolation mode by operating the first primary switching device 242 and the second primary switching device 246 in the open state and concurrently operating the first secondary switching device 244 and the second secondary switching device 248 in the closed state. If so, a conduction path (e.g., a closed circuit) is formed between the fuel-cell pack 220 and the load 230 through, in sequence, the first junction 442, the first secondary switching device 244, the second battery connection terminal 448, the second secondary switching device 248 and the second junction 444 such that the fuel-cell pack 220 is coupled to the load 230 for driving of the load 230 by the fuel-cell pack 220. However, no conduction path is formed between the fuel-cell pack 220 and the battery 210 or between the load 230 and the battery 210 such that the battery 210 is functionally (e.g. electrically) decoupled from the fuel-cell pack 220 and the load 230.

Equally, the electrical system 200 may be configured in the battery-isolation mode by operating the first primary switching device 242 and the second primary switching device 246 in the closed state and concurrently operating the first secondary switching device 244 and the second secondary switching device 248 in the open state. If so, a conduction path (e.g., a closed circuit) is formed between the fuel-cell pack 220 and the load 230 through, in sequence, the first junction 442, the first primary switching device 242, the first battery connection terminal 446, the second primary switching device 246 and the second junction 444 such that the fuel-cell pack 220 is coupled to the load 230 for driving of the load 230 by the fuel-cell pack 220. Nevertheless, no conduction path is formed between the fuel-cell pack 220 and the battery 210 or between the load 230 and the battery 210 such that the battery 210 is functionally decoupled from the fuel-cell pack 220 and the load 230.

The electrical system 200 may be configured in the battery-charge mode by operating the first secondary switching device 244 and the second primary switching device 246 in the open state and concurrently operating the first primary switching device 242 and the second secondary switching device 248 in the closed state. If so, a conduction path (e.g., a closed circuit) is formed between the fuel-cell pack 220, the battery 210 and the load 230 through, in sequence, the first junction 442, the first primary switching device 242, the first battery connection terminal 446, the battery 210, the second battery connection terminal 448, the second secondary switching device 248, and the second junction 444 such that the battery 210 is coupled in series to the fuel-cell pack 220 and the load 230 for simultaneous charging of the battery 210 and driving of the load 230 by the fuel-cell pack 220. In particular, the electrical polarity of the battery 210 is orientated with respect to the electrical polarity of the fuel-cell pack 220 such that the positive pole of the fuel-cell pack 220 is electrically coupled in series to the positive pole of the battery 210 and vice versa. This may be referred to as a first orientation of the polarity of the battery 210 with respect to the polarity of the fuel-cell pack 220, suitable for charging the battery.

The electrical system 200 may be configured in the combined-drive mode by operating the first primary switching device 242 and the second secondary switching device 248 in the open state and concurrently operating the first secondary switching device 244 and the second primary switching device 246 in the closed state. If so, a conduction path (e.g., a closed circuit) is formed between the fuel-cell pack 220, the battery 210 and the load 230 through, in sequence, the first junction 442, the first secondary switching device 244, the second battery connection terminal 448, the battery 210, the first battery connection terminal 446, the second primary switching device 246, and the second junction 444 such that the battery 210 is coupled in series to the fuel-cell pack 220 and the load 230 for driving of the load 230 by both the battery 210 and the fuel-cell pack 220. In particular, an electrical polarity of the battery 210 is orientated with respect to an electrical polarity of the fuel-cell pack 220 such that a positive pole of the fuel-cell pack 220 is electrically coupled in series to a negative pole of the battery 210 while a negative pole of the fuel-cell pack 220 is electrically coupled in series to a positive pole of the battery 210 through the load 230. This may be referred to as a second orientation of the polarity of the battery 210 with respect to the polarity of the fuel-cell pack 220 suitable for driving the load 230, with the second orientation opposing the first orientation described above with reference to the battery-charge mode.

Further, in the first example electrical topology 201 of the electrical system 200, the DC-DC converter 250 is a buck DC-DC converter 250 (e.g., a step-down DC-DC converter 250). To this end, the DC-DC converter 250 comprises a first buck switching device 552, a second buck switching device 554 and a buck inductor 551. The first buck switching device 552 and the buck inductor 551 are connected in series (through a first buck junction) with respect to each other and with respect to the battery connection terminals 446, 448, whereas the second buck switching device 554 is connected in parallel with respect to the battery connection terminals 446, 448 at the first buck junction and a second buck junction. A duty cycle of the first buck switching device 552 may be controlled by the control system 290 to vary the conversion ratio of the DC-DC converter 250 between a small non-zero value which is less than unity, and unity.

For the purpose of voltage smoothing (e.g., voltage ripple reduction), the DC-DC converter 250 may also comprise a pair of capacitors 251, 251' which are arranged within the DC-DC converter so as to be connected in parallel between the battery 210 and the switching arrangement 240.

FIG. 4 also shows a fuel-cell pack sensing arrangement 292 and a load monitoring sensing arrangement 293. The fuel-cell pack monitoring (e.g., sensing) arrangement 292 is configured to monitor a parameter of an electrical power provided by the fuel-cell pack 220, as discussed in further detail below. In a like manner, the load monitoring (e.g., sensing) arrangement 293 is configured to monitor a parameter of an electrical power provided to the load 230, as also discussed in further detail below.

Figure 5:
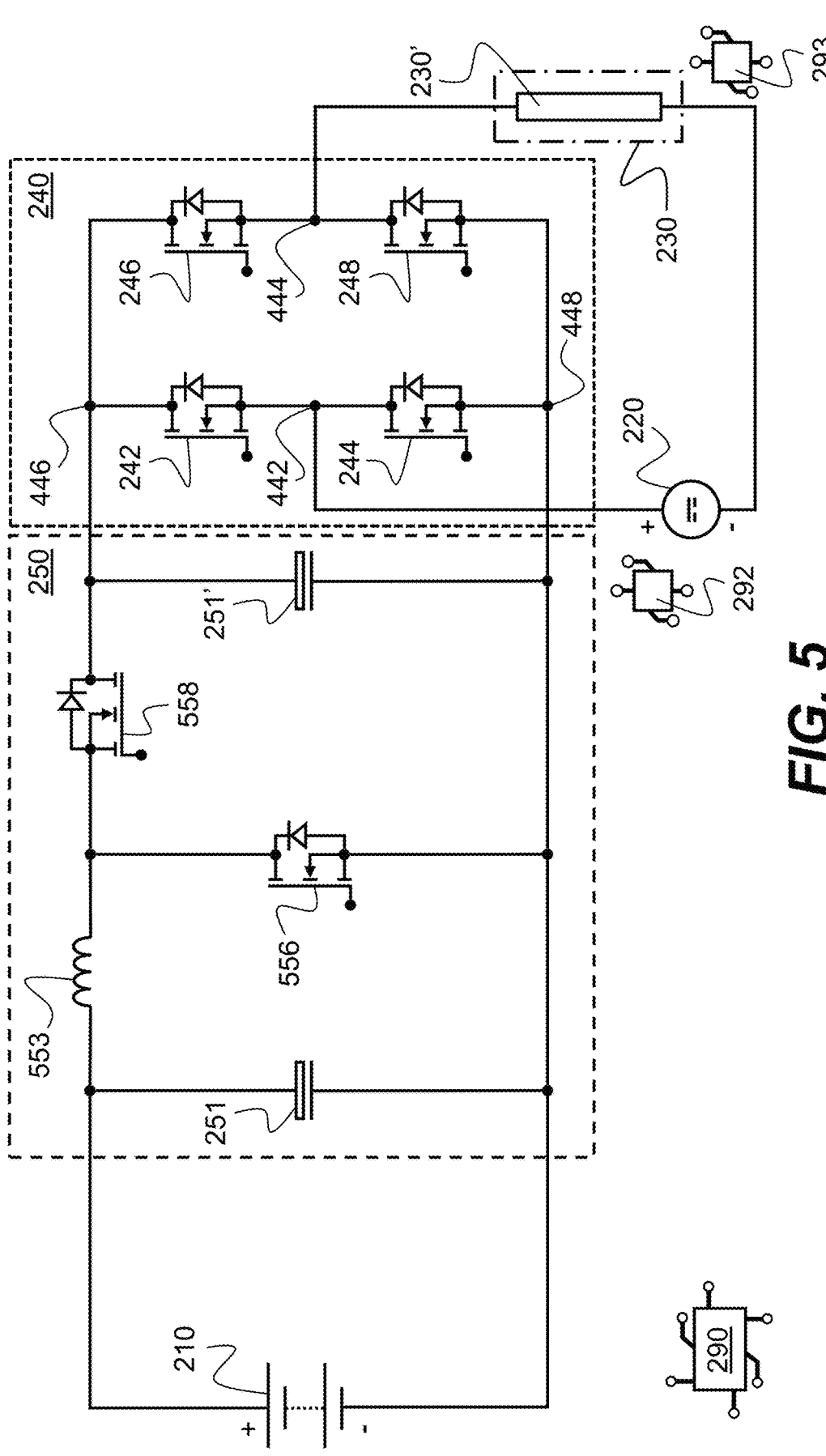
FIG. 5 is a circuit diagram which shows a second example electrical topology of the example electrical system of FIG. 3.

FIG. 5 is a circuit diagram which shows a second example electrical topology 202 for the electrical system 200 of FIG. 3. The second example electrical topology 202 is generally similar to the first example electrical topology 201 described above with reference to FIG. 4, with like reference numerals denoting common or similar features.

However, in the second example electrical topology 202 of the electrical system 200, the DC-DC converter 250 is a boost converter (e.g., a step-up DC-DC converter 250). For this purpose, the DC-DC converter 250 comprises a first boost switching device 556, a second boost switching device 558 and a boost inductor 553. The second boost switching device 558 and the boost inductor 553 are connected in series (through a first boost junction) with respect to each other and with respect to the battery connection terminals 446, 448, whereas the first boost switching device 556 is connected in parallel with respect to the battery connection terminals 446, 448 at the first boost junction and a second boost junction. A duty cycle of the first boost switching device 556 may be controlled by the control system 290 to vary the conversion ratio of the DC-DC converter 250 between unity and a large non-infinite value greater than unity.

Figure 6:
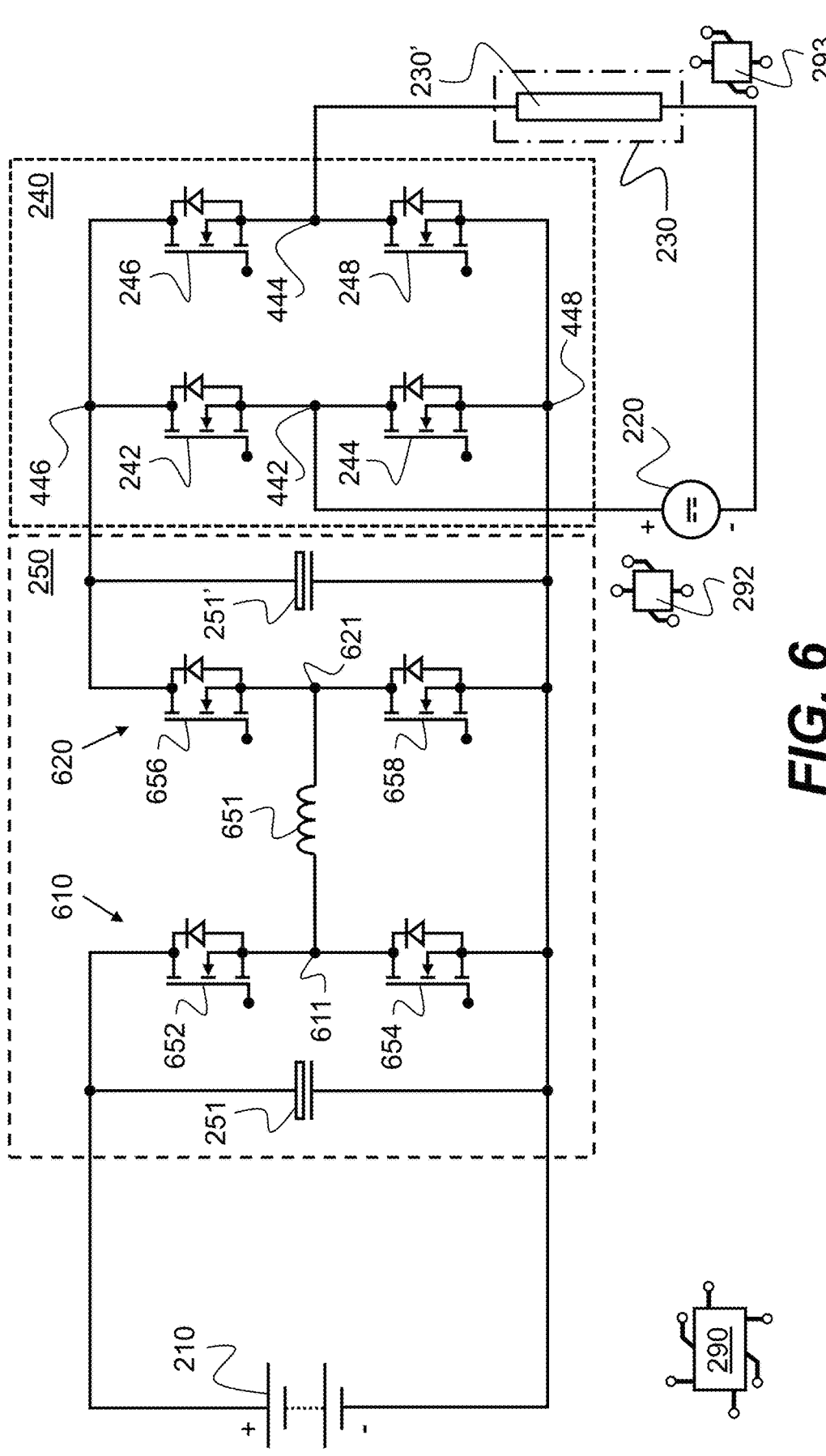
FIG. 6 is a circuit diagram which shows a third example electrical topology of the example electrical system of FIG. 3.

FIG. 6 is circuit diagram which shows a third example electrical topology 203 for the electrical system 200 of FIG. 3. The third example electrical topology 203 is generally similar to both the first example electrical topology 201 and the second example electrical topology 202 described above with reference to FIGS. 4 and 5, respectively, with like reference numerals denoting common or similar features.

However, in the third example electrical topology 203 of the electrical system 200, the DC-DC converter 250 is a buck-boost converter. To this end, the DC-DC converter 250 comprises a plurality of buck-boost switching devices and a buck-boost inductor 651. The plurality of buck-boost switching devices includes a first buck-boost switching device 652, a second buck-boost switching device 654, a third buck-boost switching device 656, a fourth buck-boost switching device 658. The plurality of buck-boost switching devices and the buck-boost inductor 651 are mutually connected to each other according to a typical buck-boost converter arrangement, as will be recognisable to those skilled in the art. Namely, the first buck-boost switching device 652 and the second buck-boost switching device 654 are connected in series through a first leg junction 611 to form a first switching leg 610, with the first switching leg 610 being coupled in parallel to the battery 210. The third buck-boost switching device 656 and the fourth buck-boost switching device 658 are connected in series through a second leg junction 621 to form a second switching leg 620, with the second switching leg 620 being coupled in parallel to the switching arrangement 240. The boost inductor 651 is connected between the first leg junction 611 and the second leg junction 621. An operating parameter of each of the plurality of buck-boost switching devices (e.g. a duty cycle and/or a switching frequency) may be controlled by the control system 290 to vary the conversion ratio of the DC-DC converter 250 between a small non-zero value which is less than unity and a large non-infinite value which is greater than unity.

Figure 7:
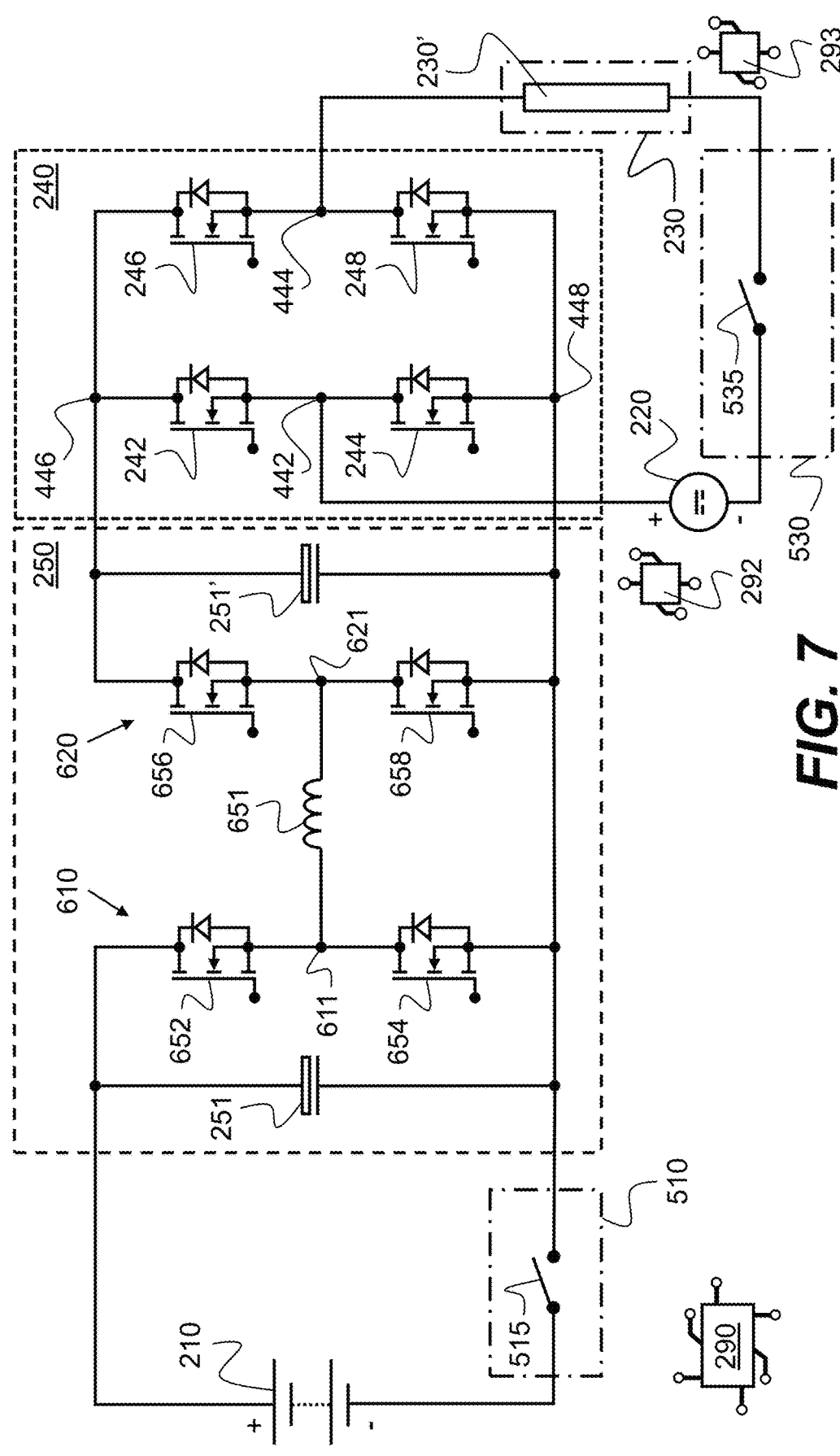
FIG. 7 is a circuit diagram which shows a fourth example electrical topology of the example electrical system of FIG. 3.
Figure 8:
FIG. 8 is a circuit diagram which shows a fifth example electrical topology of the example electrical system of FIG. 3.

FIG. 7 is circuit diagram which shows a fourth example electrical topology 204 for the electrical system 200 of FIG. 3. FIG. 8 is circuit diagram which shows a fifth example electrical topology 205 for the electrical system 200 of FIG. 3. Both the fourth example electrical topology 204 and the fifth example electrical topology 205 are generally similar to the third example electrical topology 203 described above with reference to FIG. 6, with like reference numerals denoting common or similar features.

However, each of the fourth example electrical topology 204 and the fifth example electrical topology 205 further comprises a battery isolation arrangement 510 and a load isolation arrangement 530. The battery isolation arrangement 510 is operable to selectively isolate the battery 210 from the switching arrangement 240, whereas the load isolation arrangement 530 is operable to selectively isolate the load 230 from the fuel-cell pack 220.

The battery isolation arrangement 510 is located between the first battery connection terminal 446 and the battery 210. However, the battery isolation arrangement 510 may otherwise be located between the second battery connection terminal 448 and the battery 210. The load isolation arrangement 530 is located between the fuel-cell pack 220 and the load 230. However, the load isolation arrangement 530 may otherwise be located between the first junction 442 and the fuel-cell pack 220 or between the second junction 444 and the load 230.

Inclusion of the battery isolation arrangement 510 within the electrical system 200 enables the electrical system to be operated in the battery-isolation mode by operating all of the switching devices 242, 244, 246, 248 of the switching arrangement 240 in the closed state while operating the battery isolation arrangement 510 so as to isolate the battery 210 from the switching arrangement 240. As a consequence, a heat dissipation rate within the switching arrangement 240 may be reduced when the electrical system 200 is operated in the battery-isolation mode, thereby increasing an efficiency of the electrical system 200.

In the fourth example electrical topology 204, each isolation arrangement 510, 530 comprises a respective isolation contractor 515, 535. In contrast, in the fifth example electrical topology 205, each isolation arrangement 510, 530 comprises a respective pair of MOSFETs connected in series, with each MOSFET being provided with a body diode. That is, the battery isolation arrangement 510 includes a first battery isolation MOSFET 512 and a second battery isolation MOSFET 514. Likewise, the load isolation arrangement 530 includes a first load isolation MOSFET 532 and a second load isolation MOSFET 534.

Further, each pair of MOSFETs are connected such that a source of one of the pair of MOSFETs is connected to a source of the other of the pair of MOSFETs. As a result, each isolation arrangement 510, 530 is configured to be able to selectively allow current to pass through in both directions, only one direction, or in neither directions as now described in detail with respect to the battery isolation arrangement 510.

When both the first battery isolation MOSFET 512 is in the on state and the second battery isolation MOSFET 514 is in the on state (in a bidirectional on state of the battery isolation arrangement 510), current is able to pass in either direction through the battery isolation arrangement 510 (e.g., from the positive pole of the battery 210 to the first battery connection terminal 446 or from the first battery connection terminal 446 to the positive pole of the battery 210). Further, when both the first battery isolation MOSFET 512 is in the off state and the second battery isolation MOSFET 514 is in the off state (in a bidirectional off state of the battery isolation arrangement 510), current is not able to pass in either direction through the battery isolation arrangement 510 (e.g., from the positive pole of the battery 210 to the first battery connection terminal 446 or from the first battery connection terminal 446 to the positive pole of the battery 210) as a result of the function of the respective body diodes.

However, when the first battery isolation MOSFET 512 is in the on state and the second battery isolation MOSFET 514 is in the off state (in a first unidirectional state on of the battery isolation arrangement 510), current is able to pass in one direction through the battery isolation arrangement 510 (e.g., from the first battery connection terminal 446 to the positive pole of the battery 210). Conversely, when the first battery isolation MOSFET 512 is in the off state and the second battery isolation MOSFET 514 is in the on state (in a second on unidirectional state of the battery isolation arrangement 510), current is able to pass in the opposite direction through the battery isolation arrangement 510 (e.g., from the positive pole of the battery 210 to the first battery connection terminal 446).

By operating the battery isolation arrangement 510 such that current may not flow from the load 230 to the battery 210 via the first battery connection terminal 446 but such that current may flow from the battery 210 to the load 230 via the first battery connection terminal 446, any electrical energy present within the load 230 is prevented from flowing to the battery 210 via the switching arrangement 240 in use.

Similarly, by operating the load isolation arrangement 530 such that current may not flow from the load 230 to the fuel-cell pack 220 in a first direction but such that current may flow from the load 230 to the fuel-cell pack 220 in a second direction, any electrical energy present within the load 230 is prevented from flowing to the fuel-cell pack 220 (and the battery 210 via the switching arrangement 240). As a result, including a pair of MOSFETs 512, 514, 532, 534 connected in this manner in the battery isolation arrangement 510 and/or the load isolation arrangement 520 enables the various components of the electrical system 200 to be protected from unintended current flows in use.

This disclosure anticipates that a battery isolation arrangement 510 and/or a load isolation arrangement 530 as described herein with respect to the fourth and fifth example electrical topologies 204, 205 and FIGS. 7 and 8 may also be incorporated within the first, second and/or third example electrical topologies 201, 202, 203 and FIGS. 4 to 6 for similar purposes and/or for obtaining similar advantages.

FIG. 9 is a flowchart which shows an example method 900 of controlling an electrical system according to the present disclosure, such as the example electrical system 200 described above with reference to FIGS. 3-8.

In general terms, the method 900 comprises controlling the DC-DC converter 250 based on a monitored parameter of an electrical power provided to the load 230 (e.g., to target maintaining a voltage across the load 230 at a target load voltage). The method 900 may also comprise operating the switching arrangement 240 to selectively configure (and reconfigure) the electrical system 200 between each of the battery-charge mode, the combined-drive mode and the battery-isolation mode (e.g., based on a monitored parameter of an electrical power provided by the fuel-cell pack 220). Specifically, the method 900 may comprise operating the switching arrangement 240 to selectively configure (and reconfigure) the electrical system 200 between each of the battery-charge mode, the combined-drive mode and the battery-isolation mode so as to meet a power demand of the load 230 and/or to maintain a monitored voltage across the load 230 within a target load voltage range.

To this end, the method 900 may include an action of monitoring (at block 910) at least one parameter of an electrical power provided by the fuel-cell pack 220. The monitored parameter of the electrical power provided by the fuel-cell pack 220 may be a voltage across the fuel-cell pack 220 or a current outputted by (e.g., through) the fuel-cell pack 220, for example. As described above, he electrical system 200 comprises a fuel-cell pack monitoring (e.g., sensing) arrangement 292 for the purpose of monitoring (at block 910) the parameter of the electrical power provided by the fuel-cell pack 220. For instance, if the monitored parameter is the voltage across the fuel-cell pack 220, the method 900 includes monitoring (at block 910) the voltage across the fuel-cell pack 220 using a fuel-cell pack voltage sensing arrangement 292. Likewise, if the monitored parameter is the current outputted by the fuel-cell pack 220, the method 900 includes monitoring (at block 910) the current outputted by the fuel-cell pack 220 using a fuel-cell pack current sensing arrangement 292. Suitable transducers and devices for use in such fuel-cell pack sensing arrangements will be apparent to those skilled in the art.

The method 900 may also include an action of selecting (at block 920) a mode for the electrical system 200 based on the monitored parameter of the electrical power provided by the fuel-cell pack 220. The action of selecting (at block 920) the mode for the electrical system 200 generally comprises selecting between the battery-charge mode, the combined-drive mode and the battery-isolation mode of the electrical system 200 as described above. After the mode for the electrical system 200 has been selected, the method 900 proceeds to an action of operating (at block 930) the switching arrangement 240 to reconfigure the electrical system 200 in the selected mode, if the electrical system 200 is not already configured in the selected mode (and otherwise to maintain the electrical system 200 in the respective mode). Accordingly, the method 900 may include operating (at block 930) the switching arrangement 240 to selectively reconfigure the electrical system 200 between the battery-charge mode, the combined-drive mode, and the battery-isolation mode based on the monitored parameter.

The action of selecting (at block 920) the mode for the electrical system 200 comprises an action of determining whether (at block 924) the monitored parameter of the electrical power provided by the fuel-cell pack 220 is in a first range. In response to a determination that the monitored parameter is in the first range, the battery-charge mode is selected for the electrical system 200 and the action of operating (at block 930) the switching arrangement 240 to reconfigure the electrical system 200 in the selected mode includes operating (at block 932) the switching arrangement 240 to reconfigure the electrical system 200 in the battery-charge mode, if the electrical system 200 is not already configured in the battery-charge mode. However, if the electrical system 200 is already configured in the battery-charge mode, no further action is immediately taken and the method 900 continues as described herein.

Otherwise, in response to a determination that the monitored parameter is not in the first range, or otherwise, the action of selecting (at block 920) the mode for the electrical system 200 may comprise an action of determining whether (at block 926) the monitored parameter is in a second range. In response to a determination that the monitored parameter is in the second range, the combined-drive mode is selected for the electrical system 200 and the action of operating (at block 930) the switching arrangement 240 to reconfigure the electrical system 200 in the selected mode includes operating (at block 934) the switching arrangement 240 to reconfigure the electrical system 200 in the combined-drive mode, if the electrical system 200 is not already configured in the combined-drive mode. However, if the electrical system 200 is already configured in the combined-drive mode, no further action is immediately taken and the method 900 continues as described herein.

Finally, in response to a determination that the monitored parameter is not in the first range and is not in the second range (for example, by sequential determinations with respect to the first and second range, or by separately determining that the monitored parameter is in a non-overlapping third range), the battery-isolation mode is selected for the electrical system 200 and the action of operating (at block 930) the switching arrangement 240 to reconfigure the electrical system 200 in the selected mode includes operating (at block 936) the switching arrangement 240 to reconfigure the electrical system 200 in the battery-isolation mode, if the electrical system 200 is not already configured in the battery-isolation mode. However, if the electrical system 200 is already configured in the battery-isolation mode, no further action is immediately taken and the method 900 continues as described herein. By virtue of the monitored parameter not being in either of the first range of the second range, it may be determined that the monitored parameter is within an intermediate range which lies between the first range and the second range. However, it is anticipated that the action of selecting (at block 920) the mode for the electrical system 200 may also comprise (e.g., following a determination that the monitored is not in the second range) an action of explicitly determining whether the monitored parameter is in an intermediate range and selecting the battery-isolation mode in response to a determination that the monitored parameter is in the intermediate range. The intermediate range may also be referred to as an isolation range.

A detailed explanation and specific examples of the first range, the second range and the intermediate range are now given with reference to FIG. 10, which is a graph 800 showing an example relationship between a voltage across the fuel-cell pack 220 and a current through the fuel-cell pack 220 as well as an example relationship between an energy efficiency of the fuel-cell pack 220 and a current through the fuel-cell pack 220. An x-axis 812 corresponds to a current, a first y-axis 814 corresponds to a voltage and a second y-axis 816 corresponds to an energy efficiency. A maximum voltage across the fuel-cell pack 220, Vmax, may generally correspond to a peak output voltage of the fuel-cell pack 220. A maximum current through the fuel-cell pack 220, Imax, corresponds to a rated limit for the current through the fuel-cell pack. The relationship between the voltage across the fuel-cell pack 220 and the current through the fuel-cell pack 220 is represented by a current-voltage curve 820 (solid line), whereas the relationship between the energy efficiency of the fuel-cell pack 220 and the current through the fuel-cell pack 220 is represented by an current-efficiency curve 830 (dashed line). It will be understood that both the current-voltage curve 820 and the current-efficiency curve 830 are intended for illustrative and explanatory purposes only, and may not be representative of real-world data for the fuel-cell pack 220.

A lower voltage threshold, $V_l$, and an upper voltage threshold, $V_u$, are marked on the first y-axis 814. The upper voltage threshold, $V_u$, separates a first voltage range 822 from the intermediate voltage range 824. The lower voltage threshold, $V_l$, separates a second voltage range 826 from an intermediate voltage range 824. As a result, each of the first voltage range 822, the intermediate voltage range 824 and the second voltage range 826 are contiguous with one another and separated by the upper voltage threshold, $V_u$, and the lower voltage threshold, $V_l$, respectively. Further, because the upper voltage threshold, $V_u$, is greater than the lower voltage threshold, $V_l$, the first voltage range 822 is wholly above both the intermediate voltage range 824 and the second voltage range 826, whereas the second voltage range 826 is wholly below both the first voltage range 822 and the intermediate voltage range 824.

In a similar way, a lower current threshold, $I_l$, and an upper current threshold, $I_u$, are marked on the x-axis 812. The lower current threshold, $I_l$, separates a first current range 832 from an intermediate current range 834. In turn, the upper current threshold, $I_u$, separates a second current range 836 from the intermediate current range 834. As a result, each of the first current range 832, the intermediate current range 834 and the second current range 836 are contiguous with one another and separated by the lower current threshold, $I_l$, and the upper current threshold, $I_u$, respectively. Further, because the upper current threshold, $I_u$, is greater than the lower current threshold, $I_l$, the first current range 832 is wholly below both the intermediate current range 834 and the second current range 836 and the second current range 836 is wholly above both the first current range 832 and the intermediate current range 834.

If the monitored parameter of the electrical power provided by the fuel-cell pack 220 (see block 910) is the voltage across the fuel-cell pack 220, the first voltage range 822 corresponds to the first range described with respect to block 924 (for the battery-charge mode), the second voltage range 826 corresponds to the second range described with respect to block 926 (for the combined-drive mode) and the intermediate voltage range 824 corresponds to the intermediate range described with respect to blocks 924 and 926 (for the battery-isolation mode).

Alternatively, if the monitored parameter of the electrical power provided by the fuel-cell pack 220 (see block 910) is the current through the fuel-cell pack 220, the first current range 832 corresponds to the first range described with respect to block 924 (for the battery-charge mode), the second current range 836 corresponds to the second range described with respect to block 926 (for the combined-drive mode) and the intermediate current range 834 corresponds to the intermediate range described with respect to blocks 924 and 926 (for the battery-isolation mode).

The monitored parameter of the electrical power provided by the fuel-cell pack 220 falling within the first range 822, 832 may be generally indicative of the power demand of the load 230 being relatively low. Therefore, by operating the switching arrangement 240 to configure the electrical system 200 in the battery-charge mode, the power demand of the load 230 may be met by the fuel-cell pack 220 alone while simultaneously charging the battery 210. This may result in the voltage across the load 230 being reduced and subsequently lying within the target load voltage range.

Conversely, the monitored parameter of the electrical power provided by the fuel-cell pack 220 falling within the second range 826, 836 may be generally indicative of the power demand of the load 230 being relatively high. Therefore, by operating the switching arrangement 240 to configure the electrical system 200 in the combined-drive mode, the power demand of the load 230 may be met by a combination of the fuel-cell pack 220 and the battery 210. This may result in the voltage across the load 230 being reduced and subsequently lying within the target load voltage range.

Lastly, the monitored parameter of the electrical power provided by the fuel-cell pack 220 falling within the intermediate range 824, 834 may be generally indicative of the power demand of the load 230 being relatively moderate and such that it may be met by the fuel-cell pack 220 alone at a present operational state of the fuel-cell pack 220. Further, as indicated by the example efficiency curve in FIG. 10, an efficiency of the fuel-cell pack may be highest when operating in the intermediate range. It will be understood that the current-voltage curve 820 and the current-efficiency curve 830 will vary according to the present operational state of the fuel-cell pack 220.

The current-efficiency curve 830 has a global maximum at which the energy efficiency of the fuel-cell pack 220 is greatest (i.e., is equal to an ideal fuel-cell pack energy efficiency, $\eta_i$). Accordingly, the global maximum corresponds to an optimal fuel-cell pack current at which the energy efficiency of the fuel-cell pack 220 is predicted or determined to be at a maximum.

In the example of FIG. 10, the upper voltage threshold, $V_u$, and the lower current threshold, $I_l$, relate to a common point on the energy efficiency curve 830 at which the energy efficiency of the fuel-cell pack 220 is predicted or determined to be equal to a target energy efficiency threshold, $\eta_t$, while the lower voltage threshold, $V_l$, and the upper current threshold, $I_u$, relate to another common point on the energy efficiency curve 830 at which the energy efficiency of the fuel-cell pack 220 is predicted or determined to be equal to the target energy efficiency threshold, $\eta_t$. The target energy efficiency threshold, $\eta_t$, is lower than the ideal fuel-cell pack energy efficiency, $\eta_i$, such that the optimal fuel-cell pack voltage lies between the lower voltage threshold, $V_l$, and the upper voltage threshold, $V_u$, and the optimal fuel-cell pack current lies between the lower current threshold, $I_l$, and the upper current threshold, $I_u$. Consequently, the intermediate voltage range 824 and the intermediate current range 834 correspond to ranges for the voltage across the fuel-cell pack 220 and the current through the fuel-cell pack 220, respectively, in which the energy efficiency of the fuel-cell pack 220 is improved compared to any of the other surrounding ranges, (e.g. compared to the first voltage range 822 and the first current range, respectively, and compared to the second voltage range 826 and the second current range 836, respectively). In the particular example of FIG. 10, the intermediate range(s) 824, 834 corresponds to the energy efficiency of the fuel-cell pack 220 being greater than at any point within the first range(s) 822, 832 or the second range(s) 826, 836, which may be referred to as terminal or outer ranges. However, in other examples the thresholds and ranges may be varied such that, while the peak efficiency is always highest in the intermediate ranges, it remains possible that an efficiency in one of the terminal ranges is higher than an operating point in one of the intermediate ranges.

When the electrical system 200 is operated in the battery-isolation mode, the voltage across the fuel-cell pack 220 is substantially equal to the voltage across the load 230 and the current through the fuel-cell pack 220 is substantially equal to the current through the load 230, neglecting any significant energy losses within other parts of the electrical system 200.

Otherwise, when the electrical system 200 is operated in the battery-charge mode, the voltage across the fuel-cell pack 220 is substantially equal to a sum of the voltage across the load 230 and a voltage across the battery 210, and the current through the fuel-cell pack 220 is substantially equal to the current through the load 230 and a current through the battery 210.

Therefore, when the electrical system 200 is configured in the battery-isolation mode and the voltage across the load 230 is relatively high, the voltage across the load 230 may be decreased by reconfiguring the electrical system 200 in the battery-charge mode. The voltage across the load 230 may be relatively high when, for instance, a power demand of the load 230 is relatively low. Hence the switching arrangement 240 may be operated (at block 930 of FIG. 9) to configure the electrical system 200 in the battery-charge mode when the power demand of the load 230 is low. A result of reconfiguring the electrical system 200 in the battery-charge mode (e.g., from the battery-isolation mode) is that the voltage across the load 230 falls. In particular, the voltage across the load 230 may be caused to fall and subsequently lie within the target load voltage range (which preferably corresponds to the intermediate voltage range 824).

In contrast, when the electrical system 200 is operated in the combined drive mode, the voltage across the fuel-cell pack 220 is substantially equal to a difference between the voltage across the load 230 and the voltage across the battery 210, and the current through the fuel-cell pack 220 is substantially equal to the current through the load 230 and a current through the battery 210.

Therefore, when the electrical system 200 is configured in the battery-isolation mode and the voltage across the load 230 is relatively low, the voltage across the load 230 may be increased by reconfiguring the electrical system 200 in the combined-drive mode. The voltage across the load 230 may be relatively low when, for instance, a power demand of the load 230 is relatively high. Hence the switching arrangement 240 may be operated (at block 930 of FIG. 9) to configure the electrical system 200 in the combined-drive mode when the power demand of the load 230 is high. A result of reconfiguring the electrical system 200 in the combined-drive mode (e.g., from the battery-isolation mode) is that the voltage across the load 230 rises. In particular, the voltage across the load 230 may be caused to rise and subsequently lie within the target load voltage range (which preferably corresponds to the intermediate voltage range 824).

The actions of the method 900 described herein therefore result in the voltage across the load 230 being biased toward (and into) target load voltage range (which preferably corresponds to the intermediate voltage range 824) when the voltage across the fuel-cell pack 220 is determined to lie within the first voltage range 822 or within the second voltage range 826. Therefore, the method 900 is executed to maintain the voltage across the load 230 within the intermediate range 824.

It may be that the action of selecting (at block 920) the mode for the electrical system 200 further comprises an action of determining (at block 922) the first range, the second range and/or the intermediate range. In some examples, the first range, the second range and/or the intermediate range may be determined by accessing values for the lower threshold and the upper threshold from a memory provided to the control system 290. In other examples, the first range, the second range and/or the intermediate range may be determined based on a state-of-charge of the battery 210. By way of example, the control system 290 may be configured to monitor the state-of-charge of the battery 210 or to receive information relating to the state-of-charge of the battery and to vary the upper threshold and/or the lower threshold based on the state-of-charge of the battery 210.

For instance, if the state-of-charge of the battery is relatively low, the control system 290 may adjust the appropriate threshold so that the electrical system 200 is more likely to be subsequently operated (at block 930) in the battery-charge mode (e.g. by adjusting the threshold to reduce the upper voltage threshold or increase the lower current threshold) and hence the state-of-charge of the battery 210 may be replenished for future use when, for example, the electrical system 200 is selected to be operated (at block 930) in the combined-drive mode. For similar reasoning, the control system 290 may adjust the appropriate threshold so that the electrical system 200 is less likely to be subsequently operated (at block 930) in the combined-drive mode (e.g. by adjusting the threshold to decrease the lower voltage threshold or increase the upper current threshold) and hence the state-of-charge of the battery 210 may be preserved for future use and/or promote net replenishment of the state-of-charge of the battery 210 as a result of any operation of the electrical system 200 in the battery-charge mode.

The method 900 includes an action of monitoring (at block 940) a parameter of an electrical power provided to the load 230. The monitored parameter of the electrical power provided to the load 230 may be a voltage across the load 230 or a current drawn by (e.g., through) the load 230. The electrical system 200 comprises a load monitoring (e.g., sensing) arrangement 293 for the purpose of monitoring (at block 940) the parameter of the electrical power provided to the load 230. For instance, if the monitored parameter is the voltage across the load 230, the method 900 includes monitoring (at block 940) the voltage across the load 230 using a load voltage sensing arrangement 293. Likewise, if the monitored parameter is the current drawn by the load 230, the method 900 includes monitoring (at block 940) the current drawn by the load 230 using a load current sensing arrangement 293. Suitable transducers and devices for use in the such load sensing arrangements will be apparent to those skilled in the art.

The method 900 further comprises an action of controlling (at block 970) the DC-DC converter based on the monitored parameter of the electrical power provided to the load 230. That is to say that the method 900 may further comprise an action of controlling (at block 970) the DC-DC converter 250 based on the monitored voltage across the load 230 or based on the monitored current through the load 230. Namely, by varying the conversion ratio of the DC-DC converter 250, the second DC voltage magnitude (i.e., the voltage across the battery connection terminals 446, 448) may be varied relative to the first DC voltage magnitude (i.e., the voltage across the battery 210). In this way, the voltage applied by (or received by) the switching arrangement 240 to (or from) the battery 210 at the battery connection terminals 446, 448 via the DC-DC converter 250 may be varied when the electrical system 200 is configured in the battery-charge mode (or the combined-drive mode).

In the case that the monitored parameter of the electrical power provided to the load 230 (as monitored at block 940) is the voltage across the load 230, the action of controlling (at block 970) the DC-DC converter 250 based on the monitored voltage across the load 230 may include controlling (at block 972) the DC-DC converter 250 to target maintaining the monitored voltage across the load 230 at a target load voltage.

As discussed above, it may be that the load 230 is associated with a design operating voltage or a design operating voltage range. In the former case, the target load voltage may be equal to the design operating voltage of the load 230.

In the latter case, the target load voltage may be equal to the lower design operating voltage of the load 230, equal to the upper design operating voltage of the load 230, or between the lower design operating voltage of the load 230 and the upper design operating voltage of the load 230 inclusive.

If the electrical system 200 is configured in the battery-charge mode, and the monitored voltage across the load 230 is higher than the target load voltage, the DC-DC converter 250 may be controlled (at block 972) to decrease the monitored voltage across the load 230 toward the target load voltage by increasing the voltage across the battery connection terminals 446, 448 (i.e., by increasing the conversion ratio of the DC-DC converter 250 and thereby increasing the second DC voltage magnitude). Alternatively, if the electrical system 200 is configured in the battery-charge mode, and the monitored voltage across the load 230 is lower than the target load voltage, the DC-DC converter 250 may be controlled (at block 972) to increase the monitored voltage across the load 230 toward the target load voltage by decreasing the voltage across the battery connection terminals 446, 448 (i.e., by decreasing the conversion ratio of the DC-DC converter 250 and thereby decreasing the second DC voltage magnitude). Further, if the electrical system 200 is configured in the combined-drive mode, and the monitored voltage across the load 230 is higher than the target load voltage, the DC-DC converter 250 may be controlled (at block 972) to decrease the monitored voltage across the load 230 toward the target load voltage by decreasing the voltage across the battery connection terminals 446, 448 (i.e., by decreasing the conversion ratio of the DC-DC converter 250 and thereby decreasing the second DC voltage magnitude). Otherwise, if the electrical system 200 is configured in the combined-drive mode, and the monitored voltage across the load 230 is lower than the target load voltage, the DC-DC converter 250 may be controlled (at block 972) to increase the monitored voltage across the load 230 toward the target load voltage by increasing the voltage across the battery connection terminals 446, 448 (i.e., by increasing the conversion ratio of the DC-DC converter 250 and thereby increasing the second DC voltage magnitude). In any of the above cases, controlling (at block 972) the DC-DC converter to target maintain the voltage across the load 230 at the target load voltage 230 may result in the conversion ratio of the DC-DC converter being varied away from unity.

The example method 900 and electrical system(s) 200 described herein enable the power demand of the load 230 to be met across a broad range of operating scenarios, in particular while maintaining the voltage across the load at the design operating voltage (which may relate to a design operating voltage range). This may be described as providing a fixed DC bus functionality for the load 230. If the power demand of the load 230 is subject to significant transient variations (e.g., fluctuations) in use, the control system 290 described herein is able to quickly respond by operating the switching arrangement 240 to reconfigure the electrical system 200 in the battery-charge mode, the combined-drive mode or the battery-isolation mode as appropriate.

As will be appreciated by those skilled in the art, at least one internal operating parameter of the fuel-cell pack 220 may be varied to control the output voltage of the fuel-cell pack 220 (i.e., the voltage across the fuel-cell pack 220) and/or the current through the fuel-cell pack 220 (i.e., the current through the fuel-cell pack 220) using appropriate means provided to the fuel-cell pack 220. Such internal parameters include a reactant flow rate (e.g., a hydrogen flow rate and/or an oxygen flow rate), a cell pressure and a cell temperature.

The at least one internal operating parameter of the fuel-cell pack 220 defines the present operational state of the fuel-cell pack 220. In particular, the at least one internal operating parameter of the fuel-cell pack 220 may be varied to control an output power of the fuel-cell pack 220. Accordingly, the method 900 may also include an action of varying (at block 960) at least one such internal operating parameter of the fuel-cell pack 220 to maintain the monitored voltage across the fuel-cell pack 220 at a target fuel-cell pack voltage and, optionally, varying (at block 960) at least one such internal operating parameter of the fuel-cell pack 220 to maintain the monitored current through the fuel-cell pack 220 at a target fuel-cell pack current.

Preferably, the target fuel-cell pack voltage corresponds to the target load voltage or the voltage across the load 230 (e.g., as monitored at block 940) and, optionally, the target fuel-cell pack current preferably corresponds to the current through the load 230 (e.g., as monitored at block 940). If so, at least one internal parameter of the fuel cell-pack 220 being varied to maintain the monitored voltage across the fuel-cell pack 220 at the target load voltage and to maintain the monitored current through the fuel-cell pack 220 at the current through the load 230 allows the power demand of the load 230 to be met by the fuel-cell pack 220 alone shortly after the control system 290 has operated the switching arrangement 240 to reconfigure the electrical system from the battery-isolation mode into the battery-charge mode or the combined-drive mode, to meet the power demand of the load 230. As a result, a total energy provided from the battery 210 (when the electrical system 200 is configured in the combined-drive mode) for meeting the power demand of the load 230 during a transient variation in the power demand of the load 230 may be reduced, allowing the electrical system 200 to be assembled using a smaller battery 210. For this reason, an installation mass and/or an installation size of the electrical system 200 may be reduced.

Further, the at least one internal parameter of the fuel cell-pack 220 being varied to maintain the monitored voltage across the fuel-cell pack 220 at the target fuel-cell pack voltage (when equal to the target load voltage) results in the voltage across the fuel-cell pack 220 being returned to the target load voltage shortly after the conversion ratio of the DC-DC converter 250 is variably controlled (e.g., controlled so as to deviate further from unity) so as to target maintaining the monitored voltage across the load 230 at the target load voltage. As a result, a time spent during operation of the electrical system 200 in which the conversion ratio of the DC-DC converter 250 is controlled to significantly deviate from unity may be relatively reduced. This is associated with a reduced level of heat dissipation within the DC-DC converter 250 and therefore an increased efficiency of the electrical system 200. Furthermore, this may mean better utilization of the inductor of the DC-DC converter 250.

Specifically, it may be that the electrical system 200 is assembled so that the peak output voltage of the fuel-cell pack 220 is at least 120% of the design operating voltage of the load 230 whereas a peak output voltage of the battery 210 is no greater than 60% of the design operating voltage of the load 230. Optionally, the peak output voltage of the battery 210 may be no greater than 40% of the design operating voltage of the load 230.

For example, if the design operating voltage of the load 230 is around 800 V, the fuel-cell pack 220 may have a peak output voltage of 1100 V (i.e., at a highest operating point), a nominal output voltage of 765 V and a minimum output voltage of 445 V (i.e., at a lowest operating point). The battery may have an expected output voltage of 265 V at 100% state-of-charge (i.e., at full charge), an expected output voltage of 252 V at 80% state-of-charge and an expected output voltage of 189 V at substantially 0% state-of-charge. This may be achieved by constructing the battery 210 from a total of 63 battery-cells connected in series, each battery-cell having an expected output voltage of 4.2 V at 100% state-of-charge (i.e., at full charge), an expected output voltage of 4 V at 80% state-of-charge and an expected output voltage of 3 V at substantially 0% state-of-charge (i.e., at deep discharge).

Because the peak output voltage of the battery 210 may be relatively low compared to the design operating voltage of the load 230, the DC-DC converter 250 may be manufactured using lower-voltage components, which is associated with a further reduced installation mass and size of the electrical system 200. For the same reason, a size (and therefore a mass) of the inductor 551, 553, 651 may be reduced. In particular, all of the switching devices of the DC-DC converter 250 may be selected from a lower voltage component family (e.g., a 650 V-rated switch family) instead of being selected from a higher voltage component family (e.g., a 1200 V-rated switch family). Switching devices from the lower voltage component family may be lighter and/or have a higher switching speed than switching devices selected from the higher voltage component family. Advantageously, because the electrical system 200 comprises the DC-DC converter 250, an operating voltage range of the battery 210 (e.g. a difference between the expected output voltage of the battery at full charge and at deep discharge) may be largely independent of the design operating voltage of the load 230. Specifically, if the electrical system 200 comprises a buck converter 250, as described with reference to FIG. 4, or a buck-boost converter 250, as described with reference to FIGS. 6-8, the peak output voltage of the battery 210 may be further reduced compared to the design operating voltage of the load 230, which may yet further reduce a size of the battery 210 and hence further reduce an installation mass and/or an installation size of the electrical system 200.

Although it has been described that the switching arrangement 240 is operable to selectively reconfigure the electrical system 200 in each of the battery-charge mode, the combined-drive mode and the battery-isolation mode, it may be that the switching arrangement 240 is operable to selectively reconfigure the electrical system 200 in only one (e.g., at least one of) of the battery-charge mode, the combined-drive mode and the battery-isolation mode. Accordingly, it may be that the control system 290 is configured to operate the switching arrangement to selectively configured (and reconfigured) the electrical system 200 between the at least one of the battery-charge mode, the combined-drive mode and the battery-isolation mode so as to maintain the operating parameter of the fuel-cell pack 220 above the target threshold.

In particular, it may be that the control system 290 is configured to operate the switching arrangement 240 to selectively reconfigure the electrical system 200 between only the battery-charge mode and the combined-drive mode (and not the battery-isolation mode). If so, the first range 822, 832 and the second range 826, 836 are separated by only a single threshold (e.g. a single voltage threshold or a single current threshold as applicable) and therefore are not separated by an intermediate range.

Figure 11:

FIG. 11 is a graph 801 which shows the same example relationship between a voltage across the fuel-cell pack 220 and a current through the fuel-cell pack 220 as well as the same example relationship between an energy efficiency of the fuel-cell pack 220 and a current through the fuel-cell pack 220 as shown by the graph 800 of FIG. 10, with like reference signs denoting similar or common features.

However, on the graph 801 of FIG. 11, a single voltage threshold, $V_d$, separating the first voltage range 822 and the second voltage range 826 is marked on the first y-axis 814 while a single current threshold, $I_d$, separating the first current range 832 and the second current range 836 is marked on the x-axis 812. In particular, in the example of FIG. 11, the single current threshold, $I_d$, has been selected to correspond to the optimal fuel-cell pack current and the single voltage threshold, $V_d$, has been selected to correspond to the optimal fuel-cell pack voltage. However, it will be appreciated that in other examples, the single thresholds may be otherwise selected.

In addition, on the graph 801 of FIG. 11, an example relationship between the voltage across the load 230 and the current through the fuel-cell pack 220 due to the action controlling (at block 972) the DC-DC converter 250 to target maintaining the monitored voltage across the load 230 at the target load voltage is represented by an additional current-voltage curve 820' (dotted line), with the target load voltage having been selected as being equal to the single voltage threshold, $V_d$.

The control system 290 may be configured to receive and analyse information relating to mission of the electrical system 200. In broad terms, the mission of the electrical system 200 corresponds to a planned operation of the electrical system 200 from which a loading profile during the mission is derivable. The mission of the electrical system 200 may correspond to a mission/flight plan of an aircraft 10 in which the electrical system 200 is incorporated. The control system 290 may determine how the battery 210 and/or the fuel-cell 220 should be utilised depending on the mission of the electrical system 200. For example, the control system 290 may be configured to assess how a time-averaged energy efficiency of the fuel-cell pack 220 during the mission/flight plan of an aircraft 10 can be maximised while ensuring that the mission/flight plan can be completed (e.g., to meet the power demand of the load 230, for example without the state-of-charge of the battery 210 becoming too low to be able to appropriately cooperate with the fuel-cell pack 220 to drive the load 230 and thereby meet the power demand of the load 230 during a transient variation in the power demand of the load 230).

As a result, it may be that the control system 290 only operates the switching arrangement 240 to configure the electrical system 200 in the battery-charge mode to ensure that the state-of-charge of the battery 210 is sufficient to complete the mission/flight plan. Alternatively, it may be that the control system 290 operates the switching arrangement 240 to configure the electrical system 200 in the battery-charge mode to provide additional charging to the battery 210 to enable the battery 210 to support operation of the fuel-cell 220 to drive the load 230 and thereby maximise the time-averaged energy efficiency of the fuel-cell pack 220 during the anticipated mission/flight plan of an aircraft 10.

Figure 12:
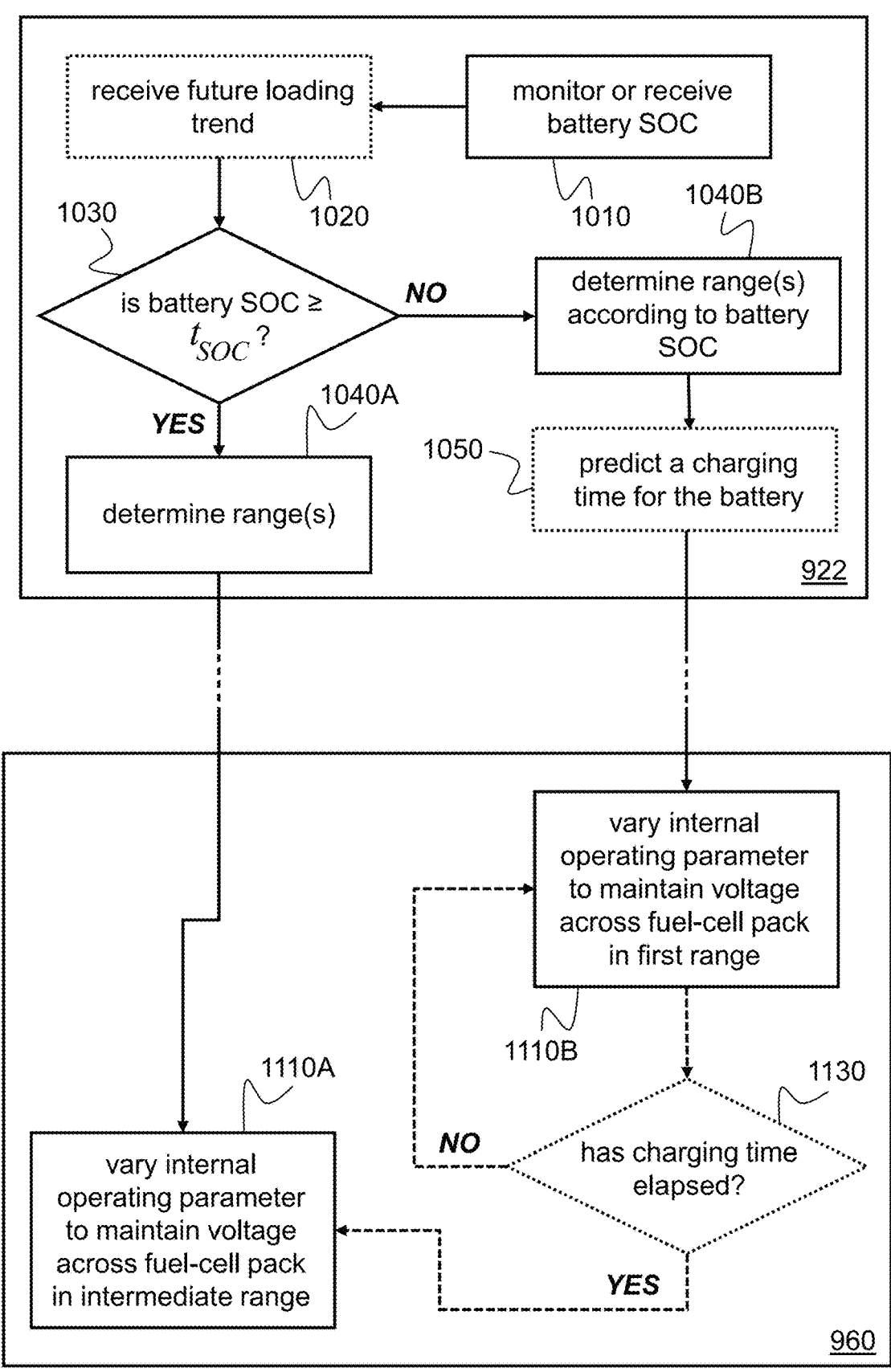
FIG. 12 is a flowchart which shows example specific implementations of selection of actions of the example method shown in FIG. 9.

To these ends, it is envisaged that the action of determining (at block 922) the first range, the second range and/or the intermediate range and the action of varying (at block 960) at least one internal operating parameter of the fuel-cell pack 220 to maintain the monitored voltage across the fuel-cell pack 220 within a target fuel-cell pack voltage range may be implemented in alternative ways depending on the operational purpose and/or available resources, examples of which are described below. FIG. 12 is a flowchart which shows an example implementation of the action of determining (at block 922) the respective range(s) as well as an example implementation of the action of varying (at block 960) at least one internal operating parameter of the fuel-cell pack 220 described above with reference to the method 700 shown by FIG. 9.

As shown in FIG. 11, the action of determining (at block 922) the range(s) may include a step of monitoring or receiving information relating to (at block 1010) the state-of-charge of the battery 210 as described above. The action of determining the range(s) may also include a step of comparing (at block 1030) the state-of-charge of the battery 210 to a state-of-charge threshold (i.e., an SOC threshold, $t_{SOC}$) which corresponds to a predicted state-of-charge to complete the mission as discussed above. The range(s) are then determined (at blocks 1040A and 1040B, see below) in accordance with a result of the comparison (at block 1030).

Generally, the SOC threshold corresponds to a state-of-charge of the battery 210 which is predicted to be sufficient for the mission of the electrical system 200. Therefore, the state-of-charge of the battery 210 being equal to or greater than the SOC threshold is indicative of the state-of-charge of the battery 210 being sufficient for the mission whereas the state-of-charge of the battery 210 being less than the SOC threshold is indicative of the state-of-charge of the battery 210 being insufficient for the mission of the electrical system 200.

It may be that the control system 290 is configured to receive (at block 1020) a signal or information relating to a future loading trend associated with the load 230. The future loading trend may correspond to a forecasted power demand of the load 230 (e.g., with respect to time) which has been predicted according to the mission of the electrical system 200. The SOC threshold may be calculated based on the future loading trend. By way of example, if the future loading trend is indicative of the power demand of the load 230 being subject to a substantial number of transient variations and/or a large magnitude transient variation, the SOC threshold may be raised accordingly, whereas a relatively uniform loading trend may correspond to a commensurately lower SOC threshold.

If the result of the comparison (at block 1030) is that the state-of-charge of the battery 210 is equal to or greater than the SOC threshold, the range(s) are determined accordingly (at block 1040A). The determination of the range(s) at block 1040A may include determining the upper voltage threshold and/or the lower voltage threshold (or the lower current threshold and/or the upper current threshold) as previously described herein (e.g., such that the intermediate range(s) 824, 834 correspond(s) to the energy efficiency of the fuel-cell pack 220 being greater than at any point within the first range(s) 822, 832 or the second range(s) 826, 836). If so, the subsequent action of varying (at block 960) at least one internal operating parameter of the fuel-cell pack 220 includes a step of varying (at block 1110A) the at least one internal operating parameter of the fuel-cell pack 220 to maintain the monitored voltage across the fuel-cell pack 220 within the intermediate range(s) 824, 834.

On the contrary, if the result of the comparison (at block 1030) is that the state-of-charge of the battery 210 is less than the SOC threshold, the range(s) are determined (at block 1040B) according to the state-of-charge of the battery 210. The determination of the range(s) (at block 1040B) may include reducing the upper voltage threshold, $V_u$ (or increasing the lower current threshold, $I_l$) and thereby increasing the size of first range(s) 822, 832 (and thereby a proportion of an operating time in which the system operates within the first range). As a result of the reducing of the upper voltage threshold, $V_u$ (or increasing the lower current threshold, $I_l$), it may be that the peak efficiency of the fuel-cell pack 220 is highest in the first range(s) 822, 832. If so, the subsequent action of varying (at block 960) at least one internal operating parameter of the fuel-cell pack 220 includes a step of varying (at block 1110B) the at least one internal operating parameter of the fuel-cell pack 220 to maintain the monitored voltage across the fuel-cell pack 220 within the first range(s) 822, 832. This may result in the energy efficiency of the fuel-cell pack 220 being temporarily relatively decreased (i.e., being sub-optimal). If the state-of-charge of the battery 210 is particularly low (e.g., significantly lower than the SOC threshold), the upper voltage threshold, $V_u$ may be subject to a larger reduction than if the state-of-charge of the battery 210 were not particularly low (e.g., not significantly lower than the SOC threshold).

Following the determination of the range(s) at block 1040B, the method 700 may include a step of predicting (at block 1050) a charging time required to increase the state-of-charge of the battery 210 so as to be equal to or greater than the SOC threshold (with the charging time being predicted on the basis of the electrical system being configured in the battery-charge mode). It will be appreciated that a rate of charging of the battery 210 is dependent on the operational state of the fuel-cell pack 220 (in particular, the electrical power provided by the fuel-cell pack 220). For these reasons, the prediction (at block 1050) of the charging time may be based on the operational state of the fuel-cell pack 220 and/or the monitored parameter of the electrical power provided by the fuel-cell pack 220.

If the method includes the step of predicting (at block 1050) the charging time, the subsequent action of varying (at block 960) at least one internal operating parameter of the fuel-cell pack 220 may include an additional step of determining (at block 1130) whether the charging time has elapsed since the at least one internal operating parameter of the fuel-cell pack 220 was varied to maintain the monitored voltage across the fuel-cell pack 220 within the first range(s) 822, 832. If it is determined (at block 1130) that the charging time has not yet elapsed, the at least one internal operating parameter of the fuel-cell pack 220 is continued to be controlled (at block 1110B) to maintain the monitored voltage across the fuel-cell pack 220 within the first range(s) 822, 832. Otherwise, if it is determined (at block 1130) that the charging time has elapsed, the at least one internal operating parameter of the fuel-cell pack 220 is varied or controlled (at block 1110A) to maintain the monitored voltage across the fuel-cell pack 220 within the intermediate range(s) 824, 834.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The present disclosure includes the subject-matter of the following numbered paragraphs ("Paras"). Unless mutually exclusive, the subject-matter of any of the following numbered Paras may be combined with the subject-matter of any of the other numbered Paras. In particular, unless mutually exclusive, the subject-matter of any of Paras 1 to 18 may be suitably combined with the subject matter of any of Paras 19 to 27. The scope of the claimed invention is defined by the appended claims rather than, for instance, the following numbered paragraphs.

Para 1. An electrical system comprising: a battery; a fuel-cell pack; a load electrically coupled to the fuel-cell pack; a switching arrangement electrically coupled to the battery, the fuel-cell pack and the load; a DC-DC converter; and a control system;

wherein the switching arrangement is operable to selectively configure the electrical system in at least one of a battery-charge mode and a combined-drive mode;

wherein in the battery-charge mode the battery is coupled in series to the fuel-cell pack and the load via the DC-DC converter for simultaneous charging of the battery and driving of the load by the fuel-cell pack;

wherein in the combined-drive mode the battery is coupled in series to the fuel-cell pack and the load via the DC-DC converter for driving of the load by both the battery and the fuel-cell pack; and wherein the control system is configured to:
        monitor a parameter of an electrical power provided to the load; and
        control the DC-DC converter based on the monitored parameter of the electrical power provided to the load.

Para 2. The electrical system of Para 1, wherein the monitored parameter of the electrical power provided to the load is a voltage across the load or a current through the load.

Para 3. The electrical system of Para 2, wherein the control system is configured to:

control the DC-DC converter to target maintaining the monitored voltage across the load at a target load voltage.

Para 4. The electrical system of any of Paras 1 to 3, wherein the switching arrangement is operable to selectively configure the electrical system in each of:

the battery-charge mode; and the combined-drive mode; and the control system is configured to operate the switching arrangement to selectively reconfigure the electrical system between the battery-charge mode and the combined-drive mode.

Para 5. The electrical system of Para 4, wherein the control system is configured to:

monitor a parameter of an electrical power provided by the fuel-cell pack; and operate the switching arrangement to selectively reconfigure the electrical system between the battery-charge mode and the combined-drive mode based on the monitored parameter of the electrical power provided by the fuel-cell pack.

Para 6. The electrical system of Para 5, wherein the control system is configured to operate the switching arrangement to selectively reconfigure the electrical system in:

the battery-charge mode in response to a determination that the monitored parameter is in a first range indicative of a power demand of the load being relatively low; and the combined-drive mode in response to a determination that the monitored parameter is in a second range indicative of the power demand of the load being relatively high.

Para 7. The electrical system of Para 6, wherein a threshold separating the first range and the second range is determined based on a state-of-charge of the battery.

Para 8. The electrical system of any of Paras 4 to 7, wherein the switching arrangement is operable to selectively configure the electrical system in each of:

the battery-charge mode;

the combined-drive mode; and a battery-isolation mode in which:

the battery is decoupled from the fuel-cell pack and the load, and the fuel-cell pack is coupled to the load for driving of the load by the fuel-cell pack; and the control system is configured to operate the switching arrangement to selectively reconfigure the electrical system between the battery-charge mode, the combined-drive mode and the battery-isolation mode.

Para 9. The electrical system of Para 8, wherein the control system is configured to:

operate the switching arrangement to selectively reconfigure the electrical system between the battery-charge mode, the combined-drive mode and the battery-isolation mode based on the monitored parameter of the electrical power provided by the fuel-cell pack.

Para 10. The electrical system of Para 9, wherein the control system is configured to operate the switching arrangement to selectively reconfigure the electrical system in:

the battery-charge mode in response to a determination that the monitored parameter is in a first range indicative of a power demand of the load being relatively low;

the combined-drive mode in response to a determination that the monitored parameter is in a second range indicative of the power demand of the load being relatively high; and the battery-isolation mode in response to a determination that the monitored parameter is in an intermediate range defined between the first range and the second range.

Para 11. The electrical system of Para 10, wherein at least one of a first threshold and a second threshold respectively separating the first range and the second range from the intermediate range is determined based on a state-of-charge of the battery.

Para 12. The electrical system of any of Paras 4 to 11, wherein the control system is configured to:

when the electrical system is configured in the battery-charge mode, control the DC-DC converter to target maintaining the monitored voltage across the load at a target load voltage; and when the electrical system is configured in the combined-drive mode, control the DC-DC converter to target maintaining the monitored voltage across the load at a target load voltage.

Para 13. The electrical system of Para 3 or Para 11, wherein the load is associated with a design operating voltage; and the target load voltage is the design operating voltage of the load.

Para 14. The electrical system of Para 12, wherein the load is associated with a design operating voltage range defined by a lower design operating voltage and an upper design operating voltage; and the target load voltage is between the lower design operating voltage and the upper design operating voltage.

Para 15. The electrical system of any preceding Para, wherein the control system is further configured to:

monitor a voltage across the load;

monitor a voltage across the fuel-cell pack; and vary a reactant flow rate, a cell pressure and/or a cell temperature of the fuel-cell pack to maintain the monitored voltage across the fuel-cell pack as being equal to the monitored voltage across the load.

Para 16. The electrical system of any preceding Para, wherein the control system is further configured to:

monitor a current through the load;

monitor a current through the fuel-cell pack; and vary a reactant flow rate, a cell pressure and/or a cell temperature of the fuel-cell pack to maintain the monitored voltage through the fuel-cell pack as being equal to the monitored current through the load.

Para 17. The electrical system of any preceding Para, wherein the load is associated with a design operating voltage; and the battery has a peak output voltage of no greater than 60% of the design operating voltage of the load.

Para 18. The electrical system of any preceding Para, wherein the switching arrangement includes:

a first pair of switching devices coupled in series through a first junction, and a second pair of switching devices coupled in series through a second junction;

the first pair of switching devices and the second pair of switching devices are coupled in parallel with each other with respect to a pair of battery connection terminals; and the fuel-cell pack and the load are coupled to or couplable to the switching arrangement at the first junction and the second junction;

the battery is coupled to or couplable to the switching arrangement at the pair of battery connection terminals.

Para 19. An electrical system comprising: a battery; a fuel-cell pack; a load electrically coupled to the fuel cell pack; a switching arrangement electrically coupled to the battery, the fuel-cell pack and the load; and a control system;

wherein the switching arrangement is operable to selectively configure the electrical system in a battery-charge mode and in at least one of a battery-isolation mode and a combined-drive mode;

wherein in the battery-isolation mode the battery is decoupled from the fuel-cell pack and the load, and the fuel-cell pack is coupled to the load for driving of the load by the fuel-cell pack;

wherein in the battery-charge mode the battery is coupled to the fuel-cell pack and the load for simultaneous charging of the battery and driving of the load by the fuel-cell pack;

wherein in the combined-drive mode the battery is coupled to the fuel-cell pack and the load for driving of the load by both the battery and the fuel-cell pack; and wherein the control system is configured to:

monitor a parameter of an electrical power provided by the fuel-cell pack; and operate the switching arrangement to selectively reconfigure the electrical system between the battery-charge mode and the at least one of the battery-isolation mode and the combined-drive mode based on the monitored parameter and a state-of-charge of the battery.

Para 20. The electrical system of Para 19, wherein the control system is configured to selectively reconfigure the electrical system in the battery-charge mode in response to a determination that the monitored parameter is in a first range, and a first threshold at least partially defining the first range is determined based on the state-of-charge of the battery.

Para 21. The electrical system of Para 20, wherein the switching arrangement is operable to selectively configure the electrical system in each of the battery-charge mode and the battery-isolation mode;

the control system is configured to selectively reconfigure the electrical system in the battery-isolation mode in response to a determination that the monitored parameter is in an isolation range; and the first threshold separates the first range from the isolation range.

Para 22. The electrical system of Para 20 or Para 21, wherein the control system is configured to:

compare the state-of-charge of the battery to an SOC threshold; and according to a result of the comparison, determine the first threshold.

Para 23. The electrical system of Para 22, wherein the control system is configured to:

receive information relating to a future loading trend associated with the load; and calculate the SOC threshold based on the information relating to the future loading trend.

Para 24. The electrical system of any of Para 22 or Para 23, wherein the monitored parameter is a voltage across the fuel-cell pack;

the first range is a first voltage range; and the control system is further configured to vary a reactant flow rate, a cell pressure and/or a cell temperature of the fuel-cell pack to maintain the monitored voltage across the fuel-cell pack within the first voltage range until the state-of-charge of the battery is equal to or greater than the SOC threshold.

Para 25. The electrical system of Para 23 or Para 24, wherein the control system is configured to:

predict a charging time to increase the state-of-charge of the battery so as to be equal to or greater than the SOC threshold, wherein the charging time is predicted based on charging in the battery-charge mode.

Para 26. The electrical system of Para 25, wherein the control system is configured to predict the charging time based on:

an operational state of the fuel-cell pack; and/or the monitored parameter of the electrical power provided by the fuel-cell pack.

Para 27. The electrical system of Para 26, wherein the monitored parameter is a voltage across the fuel-cell pack;

the first range is a first voltage range; and the control system is further configured to vary a reactant flow rate, a cell pressure and/or a cell temperature of the fuel-cell pack to maintain the monitored voltage across the fuel-cell pack within the first voltage range until the predicted charging time has elapsed.

Para 28. An aircraft comprising the electrical system of any preceding Para.

We claim:

1. An electrical system comprising:

a battery;

a fuel-cell pack;

a load electrically coupled to the fuel-cell pack;

a switching arrangement electrically coupled to the battery, the fuel-cell pack and the load; a DC-DC converter; and a control system; wherein the switching arrangement is operable to selectively configure the electrical system in at least one of a battery-charge mode and a combined-drive mode;

in the battery-charge mode the battery is coupled electrically in series between the fuel-cell pack and the load via the DC-DC converter for simultaneous charging of the battery and driving of the load by the fuel-cell pack;

in the combined-drive mode the battery is coupled electrically in series between the fuel-cell pack and the load via the DC-DC converter for driving of the load by both the battery and the fuel-cell pack; and the control system is configured to:

monitor a parameter of an electrical power provided to the load;

control the DC-DC converter based on the monitored parameter of the electrical power provided to the load and wherein the switching arrangement is operable to selectively configure the electrical system in each of:

the battery-charge mode; and the combined-drive mode; and the control system is configured to operate the switching arrangement to selectively reconfigure the electrical system between the battery-charge mode and the combined-drive mode.

2. The electrical system of claim 1, wherein the monitored parameter of the electrical power provided to the load is a voltage across the load or a current through the load.

3. The electrical system of claim 2, wherein the control system is configured to:

control the DC-DC converter to target maintaining the monitored voltage across the load at a target load voltage.

4. The electrical system of claim 1, wherein the control system is configured to:

monitor a parameter of an electrical power provided by the fuel-cell pack; and operate the switching arrangement to selectively reconfigure the electrical system between the battery-charge mode and the combined-drive mode based on the monitored parameter of the electrical power provided by the fuel-cell pack.

5. The electrical system of claim 4, wherein the control system is configured to operate the switching arrangement to selectively reconfigure the electrical system in:

the battery-charge mode in response to a determination that the monitored parameter is in a first range indicative of a power demand of the load being relatively low; and the combined-drive mode in response to a determination that the monitored parameter is in a second range indicative of the power demand of the load being relatively high.

6. The electrical system of claim 5, wherein a threshold separating the first range and the second range is determined based on a state-of-charge of the battery.

7. The electrical system of claim 1, wherein the switching arrangement is operable to selectively configure the electrical system in each of:

the battery-charge mode;

the combined-drive mode; and a battery-isolation mode in which:

the battery is decoupled from the fuel-cell pack and the load, and the fuel-cell pack is coupled to the load for driving of the load by the fuel-cell pack; and the control system is configured to operate the switching arrangement to selectively reconfigure the electrical system between the battery-charge mode, the combined-drive mode and the battery-isolation mode.

8. The electrical system of claim 7, wherein the control system is configured to:

operate the switching arrangement to selectively reconfigure the electrical system between the battery-charge mode, the combined-drive mode and the battery-isolation mode based on the monitored parameter of the electrical power provided by the fuel-cell pack.

9. The electrical system of claim 8, wherein the control system is configured to operate the switching arrangement to selectively reconfigure the electrical system in:

the battery-charge mode in response to a determination that the monitored parameter is in a first range indicative of a power demand of the load being relatively low;

the combined-drive mode in response to a determination that the monitored parameter is in a second range indicative of the power demand of the load being relatively high; and the battery-isolation mode in response to a determination that the monitored parameter is in an intermediate range defined between the first range and the second range.

10. The electrical system of claim 9, wherein at least one of a first threshold and a second threshold respectively separating the first range and the second range from the intermediate range is determined based on a state-of-charge of the battery.

11. The electrical system of claim 1, wherein the control system is configured to:

when the electrical system is configured in the battery-charge mode, control the DC-DC converter to target maintaining the monitored voltage across the load at a target load voltage; and when the electrical system is configured in the combined-drive mode, control the DC-DC converter to target maintaining the monitored voltage across the load at a target load voltage.

12. The electrical system of claim 11, wherein the load is associated with a design operating voltage range defined by a lower design operating voltage and an upper design operating voltage; and the target load voltage is between the lower design operating voltage and the upper design operating voltage.

13. The electrical system of claim 1, wherein the control system is further configured to:

monitor a voltage across the load;

monitor a voltage across the fuel-cell pack; and vary a reactant flow rate, a cell pressure and/or a cell temperature of the fuel-cell pack to maintain the monitored voltage across the fuel-cell pack as being equal to the monitored voltage across the load.

14. The electrical system of claim 1, wherein the control system is further configured to:

monitor a current through the load;

monitor a current through the fuel-cell pack; and vary a reactant flow rate, a cell pressure and/or a cell temperature of the fuel-cell pack to maintain the monitored voltage through the fuel-cell pack as being equal to the monitored current through the load.

15. The electrical system of claim 1, wherein the load is associated with a design operating voltage; and the battery has a peak output voltage of no greater than 60% of the design operating voltage of the load.

16. The electrical system of claim 1, wherein the switching arrangement includes:

a first pair of switching devices coupled in series through a first junction, and a second pair of switching devices coupled in series through a second junction;

the first pair of switching devices and the second pair of switching devices are coupled in parallel with each other with respect to a pair of battery connection terminals;

the fuel-cell pack and the load are coupled to or couplable to the switching arrangement at the first junction and the second junction; and the battery is coupled to or couplable to the switching arrangement at the pair of battery connection terminals.

17. An aircraft comprising the electrical system of claim 1.

* * * * *